US009432805B2

(12) United States Patent
Narayanan et al.

(10) Patent No.: US 9,432,805 B2
(45) Date of Patent: Aug. 30, 2016

(54) DISCOVERING AND AUTOMATICALLY SIZING A PLACE OF RELEVANCE

(71) Applicants: Vidya Narayanan, San Diego, CA (US); Pawel Lukowicz, Hochspeyer (DE); Lukas D Kuhn, San Diego, CA (US); Jin Won Lee, San Diego, CA (US); Sanjiv Nanda, Ramona, CA (US)

(72) Inventors: Vidya Narayanan, San Diego, CA (US); Pawel Lukowicz, Hochspeyer (DE); Lukas D Kuhn, San Diego, CA (US); Jin Won Lee, San Diego, CA (US); Sanjiv Nanda, Ramona, CA (US)

(73) Assignee: QUALCOMM Incorporated, San Diego, CA (US)

( * ) Notice: Subject to any disclaimer, the term of this patent is extended or adjusted under 35 U.S.C. 154(b) by 101 days.

(21) Appl. No.: 13/627,823

(22) Filed: Sep. 26, 2012

(65) Prior Publication Data

US 2013/0080457 A1 Mar. 28, 2013

Related U.S. Application Data

(60) Provisional application No. 61/540,426, filed on Sep. 28, 2011.

(51) Int. Cl.
*G06F 7/00* (2006.01)
*G06F 17/30* (2006.01)
(Continued)

(52) U.S. Cl.
CPC ........ *H04W 4/021* (2013.01); *G06F 17/30241* (2013.01); *G06F 17/30598* (2013.01);
(Continued)

(58) Field of Classification Search
CPC .................. G06F 17/30598; G06F 17/30241; H04W 4/023; Y10S 707/921
USPC ...................... 707/737, 921, 758; 455/456.2
See application file for complete search history.

(56) References Cited

U.S. PATENT DOCUMENTS 6,938,234 B1 8/2005 Teig et al.
7,395,073 B2 7/2008 Gwon et al.
(Continued)

FOREIGN PATENT DOCUMENTS

JP 2001128222 A 5/2001
JP 2006308361 A 11/2006

OTHER PUBLICATIONS

International Search Report and Written Opinion dated Dec. 6, 2012 by EPO in International Application PCT/US2012/057579.
(Continued)

*Primary Examiner* — Usmaan Saeed
*Assistant Examiner* — Brian E. Weinrich
(74) *Attorney, Agent, or Firm* — Silicon Valley Patent Group LLP

(57) ABSTRACT

One or more mobile devices make measurements while moving along a path. Each measurement may comprise a specific group of identifiers of wireless transmitters, and strengths of corresponding wireless signals. A set of measurements are made in a sequence along a path, and the subsets of the measurements are identified for satisfying a test on a value of a measure of similarity of measurements included in the subset. A new place of relevance is identified, by comparing the just-described subsets of the measurements with similar subsets of additional measurements (e.g. by clustering). Alternatively, a known place of relevance (e.g. having a label) is identified, by comparing the just-described subsets of the measurements with pre-computed model of measurements. Also, the just-described subsets of the measurements may be compared with corresponding subsets of measurements of another path, e.g. to identify common portions therein.

66 Claims, 21 Drawing Sheets

100 Processor

971 Receive a set of measurements of wireless signals

972 Identify one or more places, each place having a centroid obtained by using a subset in the set of measurements (e.g. each subset may be identified based on similarity of measurements indicating user is in the same place)

972B Identification is independent of time of measurement, e.g. compare labels, whether similar 972A Identification is based on measurements being made sequentially in time 973 Determine, based on comparing two centroids, whether corresponding two places that have the two centroids are similar 974 Store, in non-transitory memory, a place of relevance including the corresponding two places, based on the corresponding two places being determined to be similar

(51) Int. Cl.

| | |
|---|---|
| ***H04W 24/00*** | (2009.01) |
| ***H04W 4/02*** | (2009.01) |
| ***H04W 4/04*** | (2009.01) |
| ***H04W 64/00*** | (2009.01) |
| *G06F 15/16* | (2006.01) |
| *H04W 4/20* | (2009.01) |

(52) U.S. Cl.

CPC ............. *H04W4/023* (2013.01); *H04W 4/043* (2013.01); *H04W 64/00* (2013.01); *H04W 4/206* (2013.01); *Y10S 707/921* (2013.01)

(56) References Cited

U.S. PATENT DOCUMENTS

| | | | | |
|---|---|---|---|---|
| 8,073,464 | B2 | 12/2011 | Lin | |
| 8,090,384 | B2 * | 1/2012 | Alles et al. | 455/456.2 |
| 8,280,384 | B2 * | 10/2012 | Carlson et al. | 455/456.2 |
| 2008/0214202 | A1 * | 9/2008 | Toomey | 455/456.1 |
| 2008/0214205 | A1 * | 9/2008 | Alles et al. | 455/456.1 |
| 2010/0144367 | A1 | 6/2010 | Goh et al. | |
| 2010/0317371 | A1 | 12/2010 | Westerinen et al. | |
| 2011/0018732 | A1 * | 1/2011 | Cho et al. | 340/825.49 |
| 2011/0182238 | A1 * | 7/2011 | Marshall et al. | 370/328 |
| 2011/0306354 | A1 | 12/2011 | Ledlie et al. | |
| 2013/0079031 | A1 * | 3/2013 | Kuhn et al. | 455/456.1 |

OTHER PUBLICATIONS

Written Opinion of the International Preliminary Examining Authority dated Nov. 22, 2013 by EPO in International Application PCT/US2012/057579.

* cited by examiner

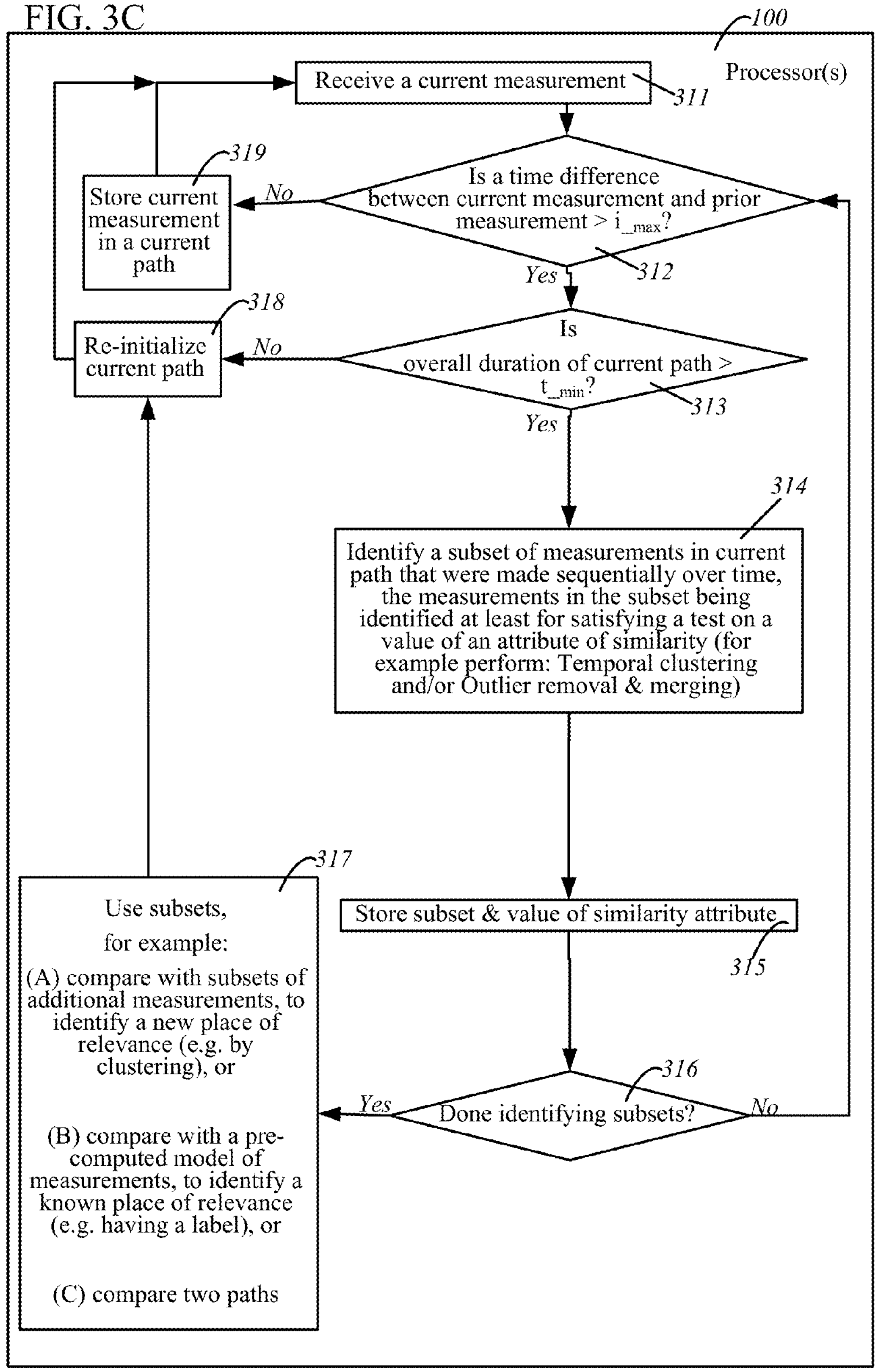
FIG. 3C
100
Processor(s)
Receive a current measurement
311
Is a time difference between current measurement and prior measurement > i_max?
312
No
Yes
Store current measurement in a current path
319
Is overall duration of current path > t_min?
313
No
Yes
Re-initialize current path
318
Identify a subset of measurements in current path that were made sequentially over time, the measurements in the subset being identified at least for satisfying a test on a value of an attribute of similarity (for example perform: Temporal clustering and/or Outlier removal & merging)
314
Store subset & value of similarity attribute
315
Done identifying subsets?
316
Yes
No
Use subsets, for example:
(A) compare with subsets of additional measurements, to identify a new place of relevance (e.g. by clustering), or
(B) compare with a pre-computed model of measurements, to identify a known place of relevance (e.g. having a label), or
(C) compare two paths
317

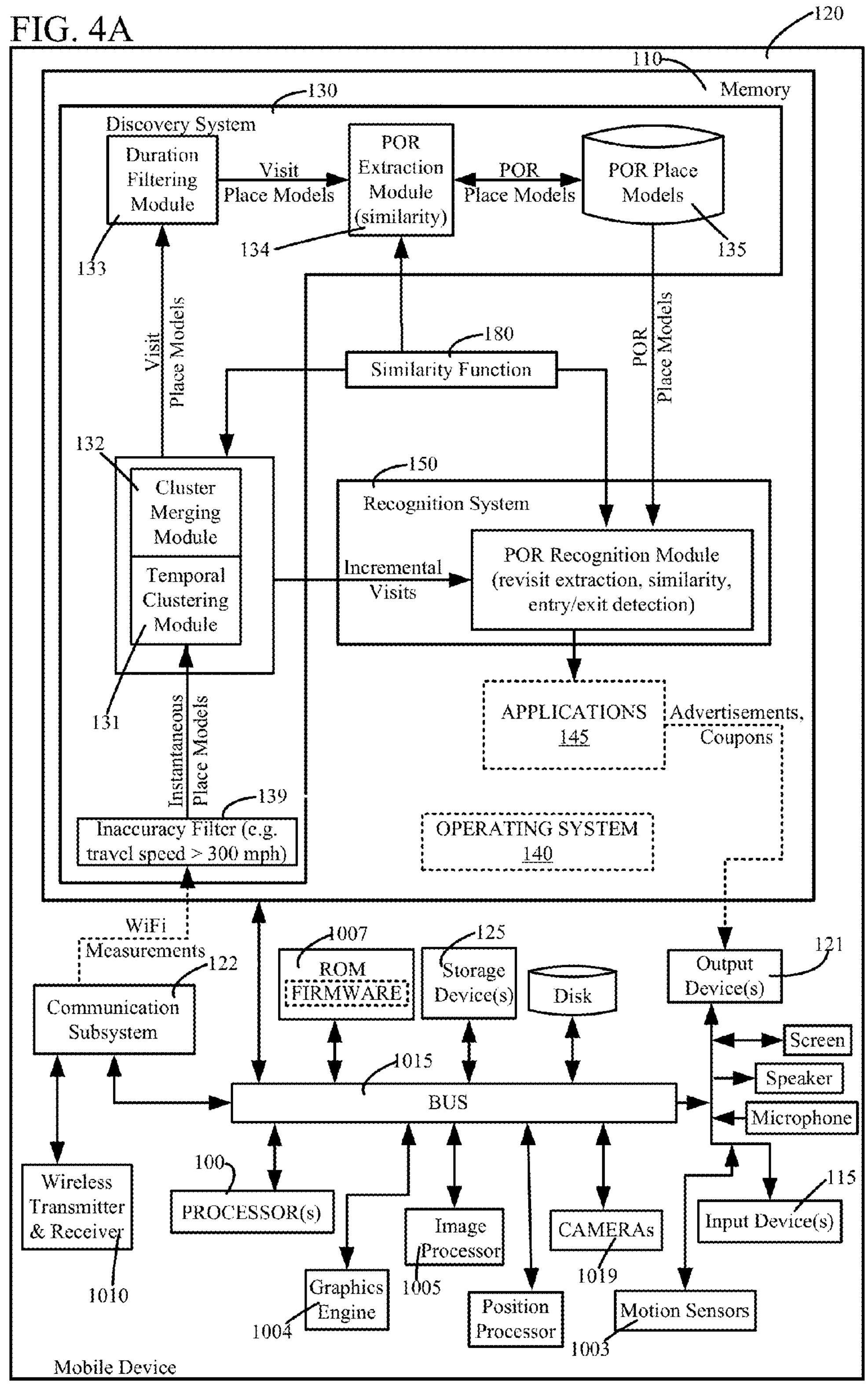

FIG. 4A
120
110
Memory
130
Discovery System
Duration Filtering Module
Visit Place Models
POR Extraction Module (similarity)
POR Place Models
POR Place Models
133
134
135
Visit Place Models
POR Place Models
180
Similarity Function
132
Cluster Merging Module
Temporal Clustering Module
150
Recognition System
Incremental Visits
POR Recognition Module (revisit extraction, similarity, entry/exit detection)
131
APPLICATIONS 145
Advertisements, Coupons
Instantaneous Place Models
139
Inaccuracy Filter (e.g. travel speed > 300 mph)
OPERATING SYSTEM 140
WiFi Measurements
122
Communication Subsystem
1007
ROM
FIRMWARE
125
Storage Device(s)
Disk
121
Output Device(s)
Screen
Speaker
Microphone
1015
BUS
100
PROCESSOR(s)
Wireless Transmitter & Receiver
1010
Graphics Engine
1004
Image Processor
1005
Position Processor
CAMERAs
1019
Motion Sensors
1003
Input Device(s)
115
Mobile Device

FIG. 4B

| Parameters | | Description |
|---|---|---|
| Place Discovery | $T_{minVisit}$ | Minimum number of visits to qualify as a POR e.g. at least 3 visits<br>e.g you went to a hair dresser not a gas station in Milwaukee |
| | $T_{minVTime}$ | Minimum time duration for a visit to qualify as a place visit |
| | $T_{tempClust}$ | Similarity threshold of the temporal clustering,<br>e.g. >0.77 means it's the same place. |
| | $T_{mergeSim}$ | Similarity threshold of the outlier removal |
| | $T_{mergeTime}$ | Time threshold of the outlier removal,<br>e.g. only away for 5 minutes to the bathroom |
| | $T_{simClust}$ | Similarity threshold of the similarity clustering<br>Of centroids of individual visits and which should be in the same bucket and therefore considered to be the same place |
| Place Recognition | $T_{recog}$ | Similarity threshold of the recognition system |

POR Extraction
- Similarity Clustering
Visit Extraction
- Duration-based filtering
Visit Extraction
- Merging of Clusters
Visit Extraction
- Temporal Clustering
Time-ordered Data
Ground-truth Label
Home
Commute
Work
Commute
Home
490
480
470
460
401
402
491
496
499
481
482
486
489
461
461A
461B
461C
462
463
463A
463B
464
471
471A
472
473
474
475
476
477
478
479
410
411
412
413
414
415
416
417
418
420
421
422
423
424
430
431
432
433
434
440
441
442
450
451
452
453
454
456

FIG. 5A

```
Input:      S_int^in =< i1, i2, i3, ... > is a stream of instantaneous place models,
            where an instantaneous place model is a tuple
            i_t = (placeModel, timeStamp)
Output:     S_visit^out =< v1, v2, v3, ... > is a stream of visits,
            where a visit is a tuple
            v_t = (placeModel, startTime, endTime)
Parameter:  T_tempClust is the similarity threshold used for temporal clustering
Variable:   v_c is current visit grown based on instantaneous place models
Run:
1     v_c ⟵ empty visit
2     foreach i_t ⇚ S_int^in do
3           if (f_sim(i_t.placeModel, v_c.placeModel) > T_tempClust )
                  // add the current visit to the output stream
4                 S_visit^out ⇚ v_c;
            // initialize the current visit using the instantaneous place model
5                 v_c.placeModel ⟵ i_t.placeModel;
6                 v_c.startTime ⟵ i_t.timeStamp;
7                 v_c.endTime ⟵ i_t.timeStamp;
8           else
            // update the current visit model to include the instantaneous
9           v_c.placeModel ⟵ update(v_c.placeModel, i_t.placeModel);
10                v_c.endTime ⟵ i_t.timeStamp;
11          endif;
12    endforeach;
```

Temporal Clustering Module

FIG. 5C

```
Input:      S_visit^in =< v1, v2, v3, ... > is a stream of visits,
            where a visit is a tuple
            v_t = (placeModel, startTime, endTime)
Output:     S_visit^out =< v1, v2, v3, ... > is a stream of visits,
            where a visit is a tuple
            v_t = (placeModel, startTime, endTime)
Parameter:  T_minVTime is a time threshold to merge two visits as part of the
outlier removal
Run:
1     foreach v_i ⇚ S_visit^in do
2           if (duration(v_i) > T_minVTime );
3                 S_visit^out ⇚ v_i;
4           endif;
5     endforeach;
```

Duration Filtering Module

FIG. 5B

```
Input:      S_visit^in =< v_1, v_2, v_3, ... > is a stream of visits,
            where a visit is a tuple
            v_t = (placeModel, startTime, endTime)
Output:     S_visit^out =< v_1, v_2, v_3, ... > is a stream of visits,
            where a visit is a tuple
            v_t = (placeModel, startTime, endTime)
Parameter:  T_tempClust  is the similarity threshold to merge two visits as part
                         of the outlier removal
            t_merge  is the time threshold to merge two visits as part of the
                         outlier removal
Variable:   V is working set of visits currently in the outlier removal process
Run:
1     V ⟵ ∅;
2     foreach v_i ⇐ S_visit^in do
3           V ⟵ V ∪ {v_i};
            // output visits that won't change given the merge time
              threshold
4           foreach v_j ∈ V do
5                 if(timeGap(v_j, v_i) > t_merge )
6                       S_visit^out ⇐ v_j;
7                 endif;
8           endforeach;
            // merge visits that are similar in place and time
9           forall v_h, v_k ∈ V, h ≠ k do
10                if ( ap(v_h, v_k) < t_merge AND f_sim(v_h, v_k) < T_dist )
11                      V ⟵ V − {v_h, v_k};
12                      V ⟵ V ∪ {merge(v_h, v_k)};
13                endif;
14          endforall;
            // merge visits that overlap;
            //overlapping visits result from merging visits with visits
            //between them
15          V ⟵ mergeAllOverlappingVisits(V);
16    endForeach;
```

Cluster Merging Module

FIG. 5D

*Input:* $S_{visit}^{in} =< v_1, v_2, v_3, \ldots >$ *is a stream of visits, where a visit is a tuple* $v_t = (placeModel, startTime, endTime)$

*In & Output:* $POR = \{p_1, p_2, p_3, \ldots\}$ *is the set of all known PORs, where a POR is a tuple* $p_t = (placeModel, visitCount)$

*Parameter:* $T_{tempClust}$ *is the similarity threshold to merge two visits as part of the outlier removal*
$t_{merge}$ *is the time threshold to merge two visits as part of the outlier removal*

*Variable:* $C = \{c_1, c_2, c_3, \ldots\}$ *is a set of place clusters, where a place cluster is a tuple* $p_t = (placeModel, visitCount)$
$c_{maxSim}$ *is the cluster which is maximal similar to inputted visit.*

*Run:*

```
1   C ⟵ POR;
2   foreach v_i ⋐ S^in_visit do
        // find most similar cluster
3       c_maxSim ⟵ findMostSimilary(C, v_i);
        // determine whether or not to create a new cluster
4       if (f_sim(c_maxSim, v_i) > T_simClust)
5   c_maxSim.placeModel ⟵ update(c_maxSim.placeModel, v_i.placeModel);
6           c_maxSim.visitCount ⟵ c_maxSim.visitCount + 1;
7       else
8           c_new.placeModel ⟵ v_i.placeModel;
9           c_new.visitCount ⟵ 1;
10          C ⟵ C ∪ {c_new};
11      endif;
        // determine if clusters qualify as POR
12      foreach c_i ∈ C do
13          if (c_i.visitCount ≥ T_minVisit)
14              POR ⟵ POR ∪ {c_i}
15          endif;
16      endforeach;
17  endforeach;
```

POR Extraction Module

FIG. 5E

Input: $S_{visit}^{in} = < v_1, v_2, v_3, \ldots >$ *is a stream of visits.*

$POR = \{p_1, p_2, p_3, \ldots\}$ *is the set of all known PORs.*

Output: $S_{PORid}^{out} = < pId_1, pId_2, pId_3, \ldots >$ *is a stream POR identifier indicating the detected revisit.*

Parameter: $T_{mergeSim}$ *is the similarity threshold to merge two visits*

$T_{enter}$ *is the minimum time a visit has to last in order to recognize a revisit.*

$T_{exit}$ *is the minimum time a visit has to last in order to recognize a revisit.*

Variable: *s is the state of the system*

$p_c$ *is the POR currently being revisited*

Run:

```
1   s ⟵ "exit";
2   p_c ⟵ null place;
3   foreach v_i ⇐ S^in_visit do
4       if (s ≡ "exit")
            // recognizing the beginning of a revisit
5           if (duration(v_i) ≥ T_regEnter )
6               p_max Sim ⟵ findMostSimPOR(POR, v_i);
7               if (f_sim (p_maxSim , v_i) > T_recog )
8                   s ⟵ "enter";
9                   t_lastRecog ⟵ v_i.endTime;
10                  p_c ⟵ p_maxSim ;
11      else
            // recognizing the end of a revisit
12          if (f_sim (p_c, v_i) > T_mergeSim )
13              t_lastRecog ⟵ v_i.endTime;
14          else
15              if ( timeGap(t_lastRecog , currentTime) > T_regExit )
16                  s ⟵ exit;
20                  t_lastRecog ⟵ 0;
21                  p_c ⟵ null state;
22      S^out_state ⇐ s;
23  endforeach;
```

*POR Recognition Module*

FIG. 6B

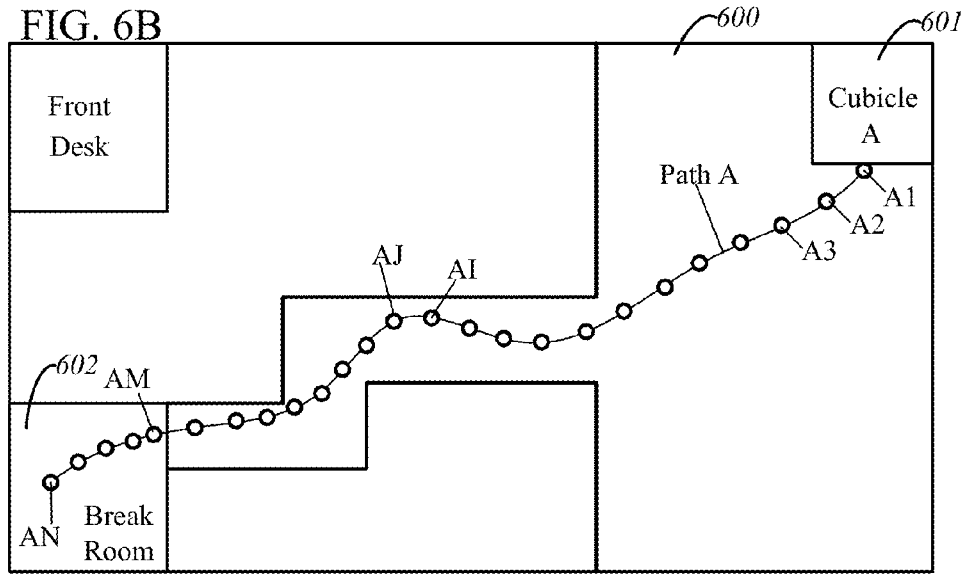

Memory measurement A1

| Identifier of WAP | Orange | Blue | Green | Red | Time |
|---|---|---|---|---|---|
| Signal Strength | 52 | 59 | 63 | 68 | 9.00 am |

• • • measurement AI

| Identifier of WAP | Orange | Blue | Green | Red | Time |
|---|---|---|---|---|---|
| Signal Strength | 54 | 58 | 61 | 66 | 9.01 am |

• • • measurement AN

| Identifier of WAP | Orange | Blue | Green | Red | Time |
|---|---|---|---|---|---|
| Signal Strength | 56 | 57 | 63 | 68 | 9.02 am |

Centroid $C_1^A$

| Identifier of WAP | Orange | Blue | Green | Red | Start | End |
|---|---|---|---|---|---|---|
| Signal Strength | 54 | 58 | 62.3 | 67.3 | 9.00 am | 9.02 am |

Similarity Attribute of AI = *Tanimoto* (measurement AI, Centroid $C_1^A$)

FIG. 6D

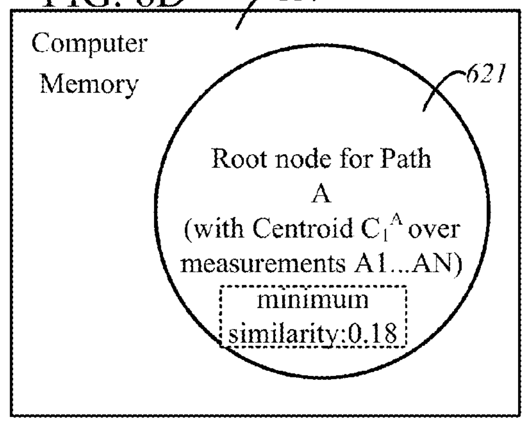

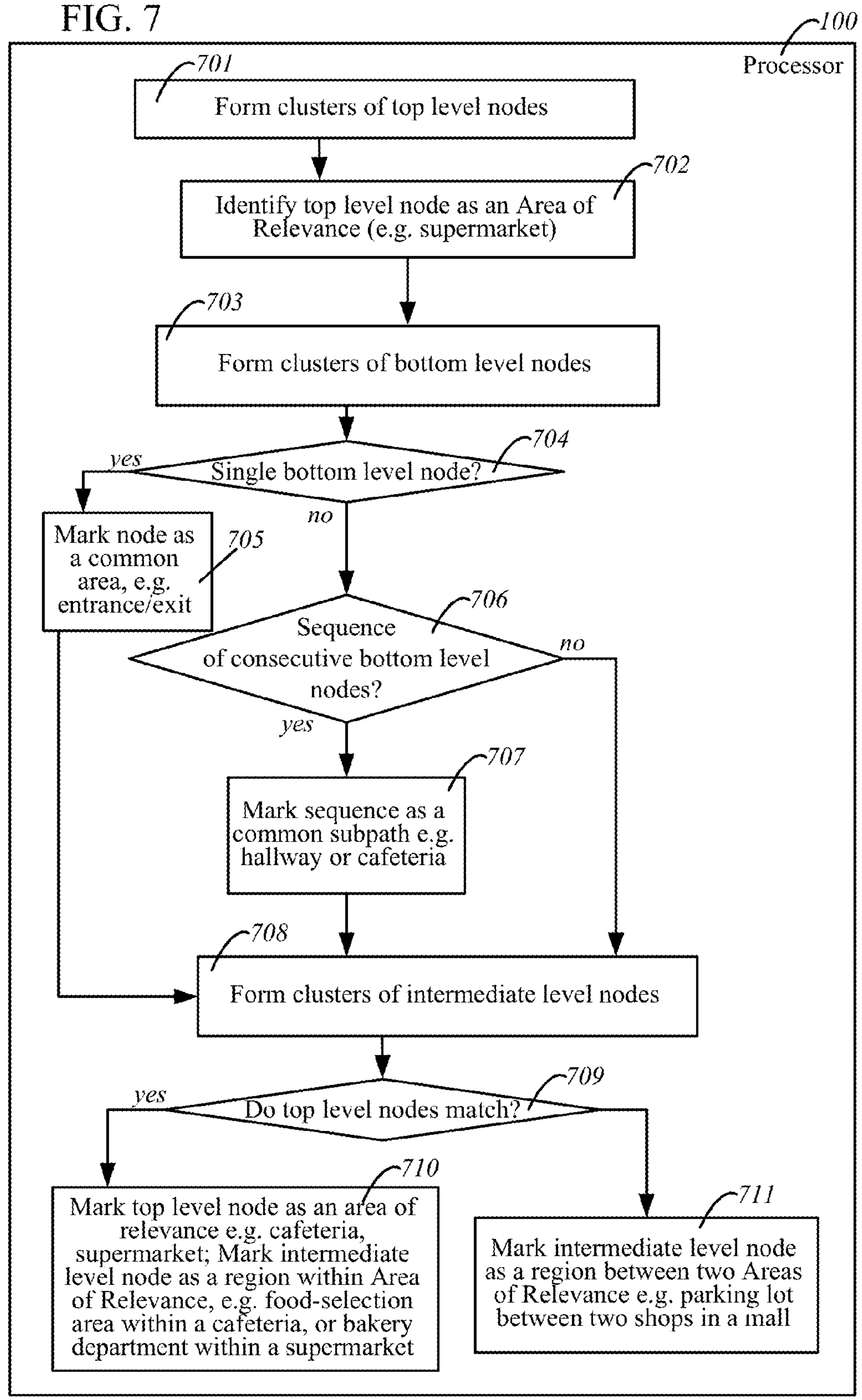
FIG. 7
100
Processor
701
Form clusters of top level nodes
702
Identify top level node as an Area of Relevance (e.g. supermarket)
703
Form clusters of bottom level nodes
704
Single bottom level node?
yes
no
705
Mark node as a common area, e.g. entrance/exit
706
Sequence of consecutive bottom level nodes?
no
yes
707
Mark sequence as a common subpath e.g. hallway or cafeteria
708
Form clusters of intermediate level nodes
709
Do top level nodes match?
yes
710
Mark top level node as an area of relevance e.g. cafeteria, supermarket; Mark intermediate level node as a region within Area of Relevance, e.g. food-selection area within a cafeteria, or bakery department within a supermarket
711
Mark intermediate level node as a region between two Areas of Relevance e.g. parking lot between two shops in a mall 900
903
910
911
914
912
913
OFFICE A
902
OFFICE B
Hallway
Conference
Room
904
RECEPTION AREA
901
Copier &
Supply
Room
Kitchenette 914
910
911
926
921
925
922
924
912
923
913

914
932
933
931
911
934
912
935
910
930
913

Frequency
3
2
1
0
μ
d size
3σ
0
0.05
0.1
0.15
0.2
0.25
0.3
pair-wise
distance d(i,j)

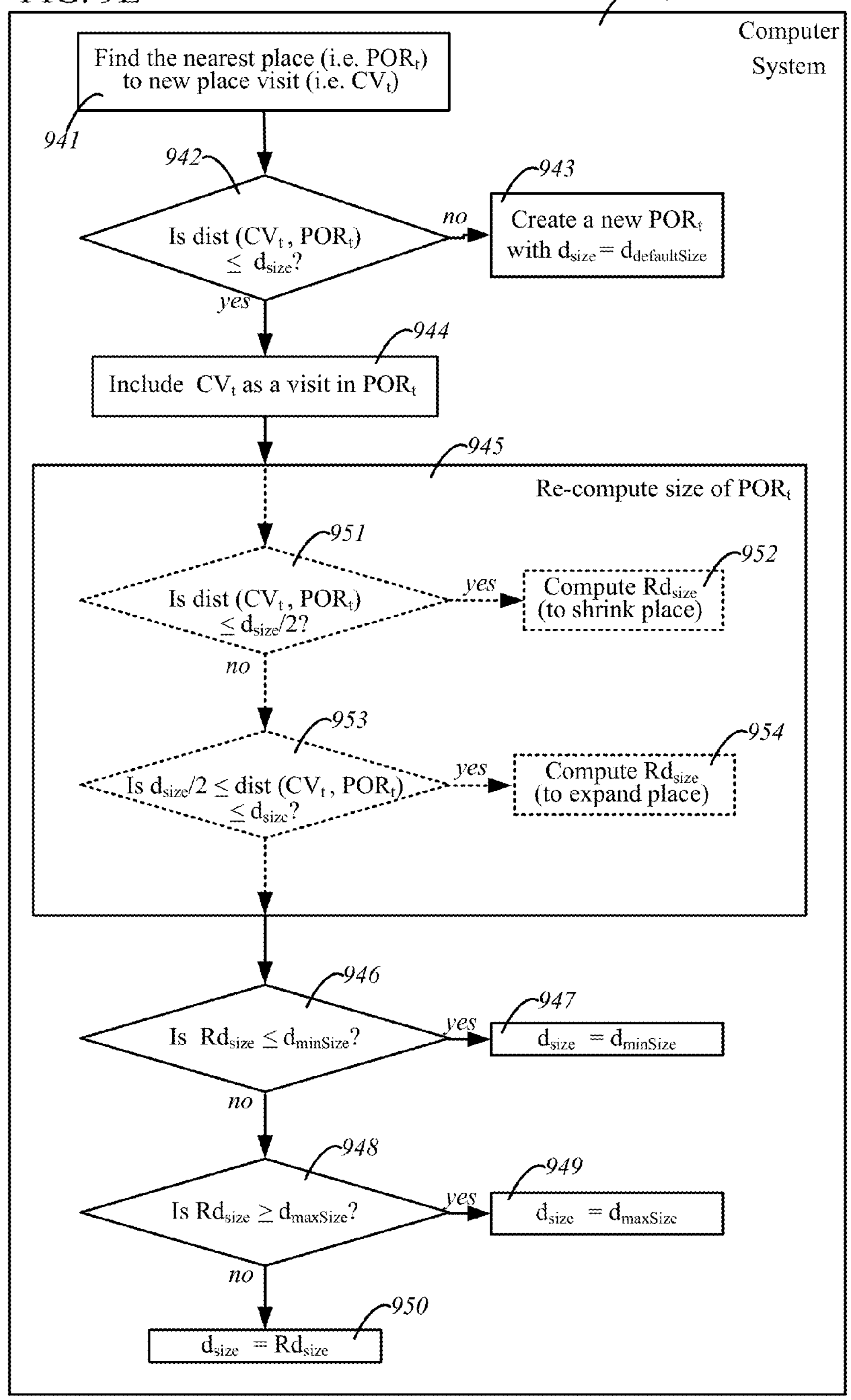
FIG. 9E
120
Computer System
Find the nearest place (i.e. $POR_t$) to new place visit (i.e. $CV_t$)
941
942
Is dist ($CV_t$, $POR_t$) ≤ $d_{size}$?
no
943
Create a new $POR_t$ with $d_{size} = d_{defaultSize}$
yes
944
Include $CV_t$ as a visit in $POR_t$
945
Re-compute size of $POR_t$
951
Is dist ($CV_t$, $POR_t$) ≤ $d_{size}/2$?
yes
952
Compute $Rd_{size}$ (to shrink place)
no
953
Is $d_{size}/2$ ≤ dist ($CV_t$, $POR_t$) ≤ $d_{size}$?
yes
954
Compute $Rd_{size}$ (to expand place)
946
Is $Rd_{size} \leq d_{minSize}$?
yes
947
$d_{size} = d_{minSize}$
no
948
Is $Rd_{size} \geq d_{maxSize}$?
yes
949
$d_{size} = d_{maxSize}$
no
950
$d_{size} = Rd_{size}$

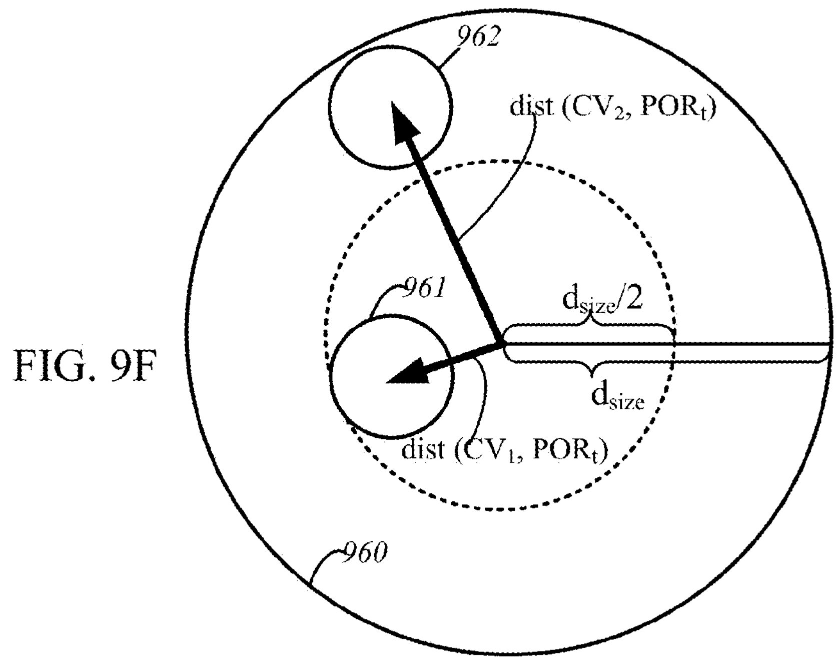
FIG. 9F
FIG. 9G
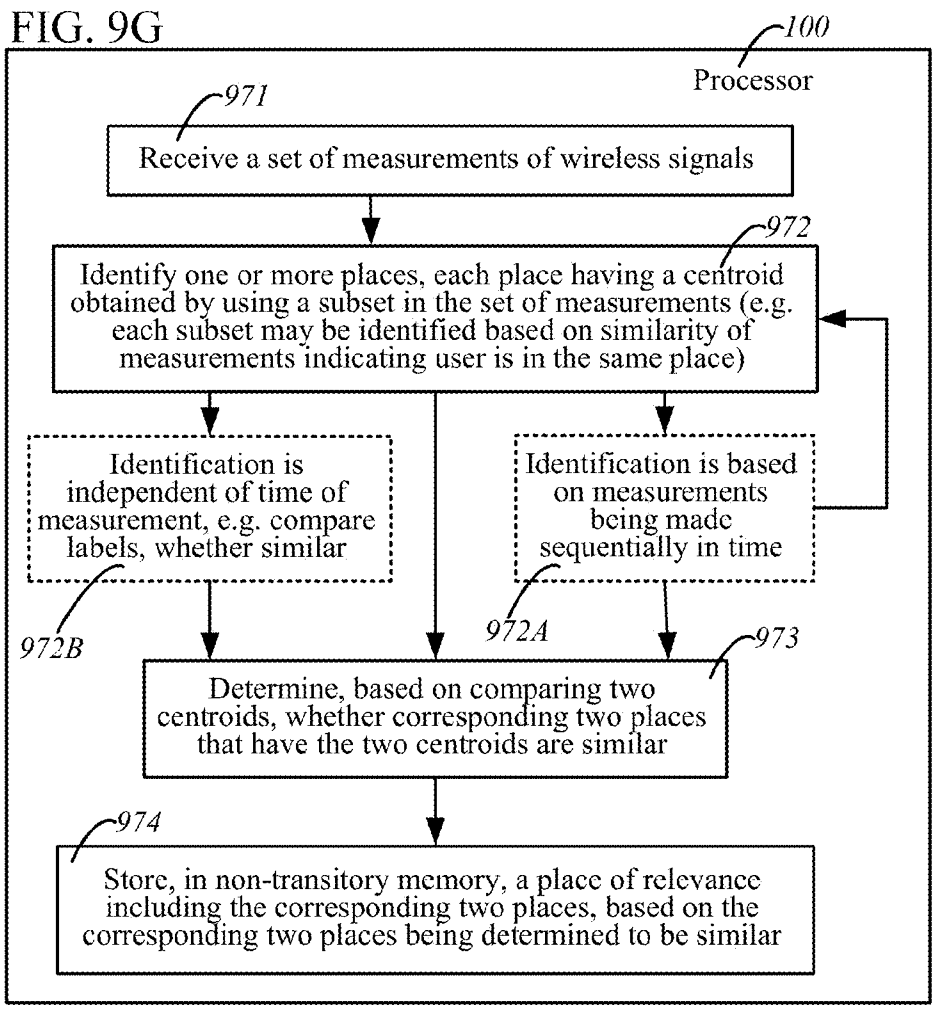

DISCOVERING AND AUTOMATICALLY SIZING A PLACE OF RELEVANCE

CROSS-REFERENCE TO PROVISIONAL APPLICATION

This application claims priority under 35 USC §119 (e) from U.S. Provisional Application No. 61/540,426 filed on Sep. 28, 2011 and entitled "Discovering and Automatically Sizing Places of Relevance", which is assigned to the assignee hereof and which is incorporated herein by reference in its entirety.

FIELD

Aspects of the disclosure relate to communication technologies, computing technologies, and/or location-based technologies. In particular, aspects of the disclosure relates to methods, apparatuses, systems, and computer-readable media for discovering and/or automatically sizing places of relevance. Several embodiments discover a place that is of relevance to a user, based on measurements made by one or more mobile devices while the mobile device(s) move along paths that are related to the place (e.g. paths that start in, end in or pass through the place).

BACKGROUND

A place of relevance (POR) may be any physical location and/or area that is significant to a person, who may, for instance, be a user of a mobile computing device (e.g., a wireless handset, cellular phone, smart phone, personal digital assistant (PDA), etc.). Whether a particular place is significant to the user may depend on and/or be measured by a period of time that the user spends in the physical location and/or area corresponding to the particular place. Thus, a computing device may determine that a particular place is a POR if a user of the computing device (and correspondingly, the computing device itself) remains stationary and/or spends a sufficiently long period of time in the particular place.

It is also known in the prior art for a user to supply labels, to identify places that have relevance to the user. For example, a first set of measurements may be made by a mobile device, when the mobile device is stationary. The user may thereafter label the place, where these measurements are made, as an "office." Similarly, a second set of measurements may be made when the mobile device is stationary at another location, which may thereafter be labeled by the user as "home." Accordingly, areas in which the first and second sets of measurements are made constitute two places of relevance to the user.

Therefore, there is a need to identify places of relevance of the type described above, based not only on measurements made when a mobile device is stationary but also based on measurements that are made when a mobile device is not stationary, i.e. measurements made when the mobile device is moving. One problem identified by the inventors arises when a mobile device is moved by a user along a path in a store (such as a department store, e.g. J.C. Penny or Macy's), where the user does not spend several minutes stationary in one spot but instead the user is generally walking around the confines of the store. Hence, there is a need to use measurements that are made when a mobile device is moving, to identify a place of relevance as described below.

SUMMARY

Aspects of the disclosure relate to discovering and/or automatically sizing one or more places of relevance (PORs). For instance, some PORs might not be defined to represent a single, particular point (or position at which a measurement of wireless signals is made), but instead may be defined to represent a path in real world that includes multiple points. Still other PORs may be defined to represent a set of adjacent and/or contiguous points in real world. By implementing one or more aspects of the disclosure, a computing device (and/or software executed thereon) may be able to provide a user with enhanced functionality, such as location-specific offers (e.g., coupons for nearby stores, restaurants, etc.), location-specific advertising, other location-based features, and/or location-related information and/or the like.

According to one or more aspects, in discovering one or more extended places of relevance, a plurality of places of relevance may be identified. User input specifying one or more labels to be associated with one or more places of relevance of the plurality of places of relevance may be received. Subsequently, it may be determined, based on the received user input, whether at least two places of relevance of the plurality of places of relevance are associated with a first label of the one or more labels. Then, it may be determined, based on one or more distance metrics (indicative of dissimilarity between centroids), whether the at least two places of relevance are adjacent. Thereafter, in response to determining that the at least two places of relevance are associated with the first label, and in response to determining that the at least two places of relevance are adjacent, it may be determined that the at least two places of relevance define an extended place of relevance.

In at least one arrangement, the one or more labels may be obtained from at least two different users. In one or more additional arrangements, a first set of the one or more labels may be designated as public, and a second set of the one or more labels may be designated as private to at least one user of the at least two different users. In yet one or more additional arrangements, the first label may be included in the first set.

According to one or more additional and/or alternative aspects, in discovering one or more path-based places of relevance, a plurality of position values may be received. Subsequently, one or more continuous walking segments may be identified based on the plurality of position values. Then, for at least two identified continuous walking segments, a tree of centroids corresponding to each of the at least two identified continuous walking segments may be generated. Thereafter, it may be determined, based on the generated trees of centroids, whether the at least two identified continuous walking segments match a first path.

In at least one arrangement, each of the generated trees of centroids may include a plurality of levels. In one or more additional arrangements, determining whether the at least two identified continuous walking segments match the first path may include recursively comparing corresponding levels of the generated trees of centroids. In yet one or more additional arrangements, determining whether the at least two identified continuous walking segments match the first path may include separately clustering corresponding levels of the generated trees of centroids.

In several embodiments, a mobile device makes measurements of wireless signals while being carried by a user walking along a path. Each measurement may comprise a specific group of identifiers of wireless transmitters, and strengths of corresponding wireless signals. A set of measurements are made in a temporal sequence along the user's path, and subsets of these measurements are identified for satisfying one or more predetermined test(s), e.g. on a measure of similarity of measurements included in the subset. A new place of relevance is identified, for example by comparing centroids (and/or other attributes, such as labels) of the just-described subsets of the measurements with centroids (and/or other attributes, such as labels) of similar subsets of additional measurements (e.g. by clustering). Alternatively, a known place of relevance (e.g. having a label) is identified, by comparing the just-described subsets of the measurements with pre-computed model of measurements. Also, the just-described subsets of the measurements may be compared with corresponding subsets of measurements of another path, e.g. to identify common portions therein.

BRIEF DESCRIPTION OF THE DRAWING

FIG. 3C illustrates in a high-level flow chart, acts performed by processor(s) 100 of mobile device 120 of FIG. 5A, in some of the described embodiments.

FIG. 4A illustrates, in a high-level block diagram, a mobile device 120 of several embodiments.

FIG. 4B illustrates, in a table, one or more parameters used in discovery system 130 of FIG. 4A.

FIG. 5A illustrates, in pseudo-code, a temporal clustering module of some embodiments that performs clustering of time ordered data.

FIG. 5B illustrates, in pseudo-code, a cluster merging module of some embodiments that merges clusters, thereby to exclude outliers.

FIG. 5C illustrates, in pseudo-code, a duration filtering module of some embodiments that excludes measurements made during travel other than by foot, e.g. measurements made while in a moving vehicle, such as a bicycle or a car.

FIG. 5D illustrates, in pseudo-code, a POR extraction module of some embodiments that identifies a new place of relevance, based on a stream of visits and a set of known places of relevance.

FIG. 5E illustrates, in pseudo-code, a POR recognition module of some embodiments that identifies the user's presence in a known place of relevance, based on the stream of visits and the set of known places of relevance.

FIG. 6B illustrates measurements by computer system 120 while the user is walking along a path "A" through an office 600, starting from a cubicle 601 and ending in a break room 602.

FIG. 6C illustrates, in a memory 110 of computer system 120 of FIG. 4A, measurements A1 . . . AI . . . AN, as well as a centroid $C_1^A$ over these measurements, as well as a similarity attribute (or similarity measure) of AI.

FIG. 6D illustrates a root node 621 in memory 110 for path A in FIG. 6B.

FIG. 7 illustrates, in a flow chart, acts performed in some embodiments to compare subsets of measurements of the type illustrated in FIGS. 6E and 6G with subsets of additional measurements to identify a new place of relevance in some embodiments.

FIG. 9E illustrates, in a flow chart, acts performed in some embodiments to automatically size a place of relevance, in one or more illustrative aspects of some embodiments in the disclosure.

FIG. 9F illustrates, an extended POR that is expanded or shrunk respectively depending on whether visit $CV_1$ is within distance $d_{size}/b$ from the center of the extended POR or visit $CV_2$ is between distances $d_{size}$ and $d_{size}/b$ from the center of the extended POR (for example, b=2, although b can be any constant value such as 1, 1.99, 3 etc, depending on the embodiment).

FIG. 9G illustrates in a high-level flow chart, acts performed by a processor 100 in some aspects of described embodiments.

DETAILED DESCRIPTION

Figure 1A:
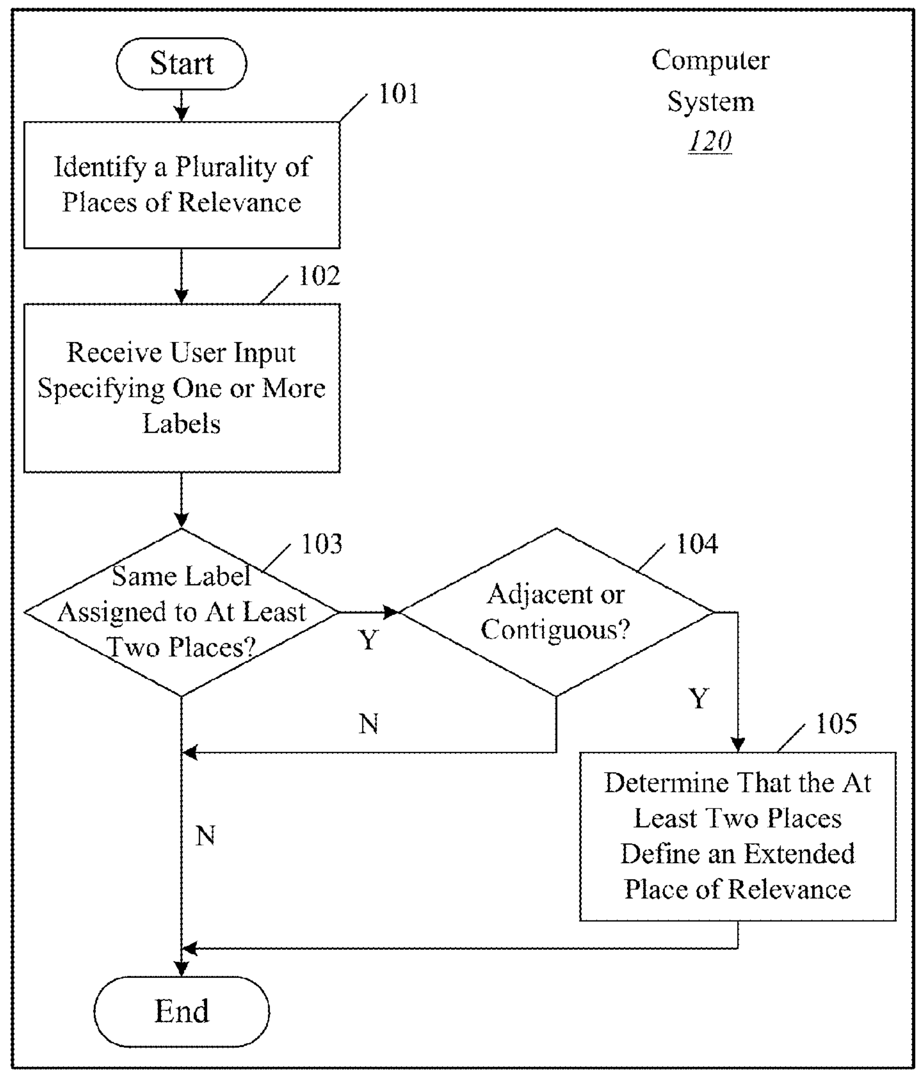
FIG. 1A illustrates an example method of discovering and/or automatically sizing one or more extended places of relevance according to one or more illustrative aspects of some embodiments in the disclosure.

Several embodiments in the following description extend systems that only consider places of relevance to be places where a user remains stationary for a sufficiently long period of time (predetermined to be, for example, 10 seconds), i.e. stationary places that have semantic relevance to the user, to have at least one of the following two enhancements: (A) Path Based Places of Relevance and (B) Extended Places of Relevance.

A first type of place of relevance (called path based place of relevance) is an area through which a user often walks, or in which the user tends to walk around often and for extended periods of time (e.g. 10 minutes). Such places of relevance ("POR"s) may also be referred to below as paths. Rather than being traditional trajectories, the path based PORs might be more loosely defined to represent regions in real world where a user's walking takes place. Examples may be supermarkets or malls where a user does not necessarily spend several minutes in one spot, but, may be generally walking around within the confines of the store.

A second type of place of relevance (called extended place of relevance) is an area in which a large number of adjacent or contiguous discovered stationary places of relevance may be semantically considered by the user to be the same place of relevance. Examples may include a cafeteria or a lecture hall or theater, where from the user's perspective, different seats may be considered the same place semantically, but existing algorithms might identify multiple stationary places of relevance. Every visit to this second type of place of relevance may be to one part of the same place, but, several embodiments described herein identify multiple visits corresponding to different parts of that place, as being to the same semantic place of relevance.

In some embodiments, a method of Extended Places of Relevance consumes the output of a stationary POR method which generates signal measurements during visits in which a user stays stationary for a predetermined time period (e.g. 10 seconds), and clusters those measurements to form places (e.g. described below in reference to FIG. 4A). Places that are output by a stationary POR method are labeled or annotated (by association with labels) in some embodiments, e.g. based on input of labels (such as strings of characters) that are received from one or more users. A method of Extended Places of Relevance in several embodiments receives and automatically compares labels (in addition to comparing centroids), and when the labels are identical or sufficiently similar (as per a predetermined threshold), automatically marks the respective places as being included in an extended place. Comparison of labels may be performed by a computing device in any manner, depending on the embodiment, e.g. labels with Hamming distance ≤2 may be deemed to be similar.

In some embodiments, the just-described method of Extended Places of Relevance is performed recursively, so that any number of places can be included in an extended POR. Note that the just-described method of Extended Places of Relevance does not use (and is independent of) a time at which a measurement was made (e.g. time stamps of measurements are not used). In contrast, a method of Path Based Places of Relevance uses temporal sequence of measurements (measurements ordered relative to one another according to a time of measurement) to identify centroids of places and/or measurements to be clustered. For example, when a specific sequence of visits by a user to a place is repeated a few times, this is learned by computer system 120 in performing the method of Path Based Places of Relevance. Hence, in some embodiments, the method of Path Based Places of Relevance does not use a POR method as a whole, and instead uses some steps therein, which are executed in a different fashion depending on the embodiment, as described herein in reference to FIGS. 4A-4C.

Extended places of relevance may be formed in certain embodiments of a computing device as follows: (1) user input to apply the same (or sufficiently similar) label to different stationary places of relevance; (2) A distance metric (indicative of dissimilarity between measurements) used for discovering stationary places of relevance can be used to automatically determine that multiple stationary places of relevance are adjacent or contiguous. All of the stationary places of relevance that satisfy conditions 1 and 2 (e.g., the two conditions above) might then be associated with a larger extended place of relevance. This method may result in correct discovery (e.g. automatic identification) of places that in the real world may be, for example, a cafeteria and theater, as extended places of relevance. In addition, the computing device may be configured to not merge multiple places that the user may select as work to form an extended place of relevance if the stationary places of relevance do not satisfy condition 2 (e.g., the second condition above).

To apply this method to automatically discover extended places of relevance when labels are obtained from multiple users, labels might need to be chosen carefully. For example, if two employees label a stationary place of relevance as Office or My Office, and they have adjacent offices, they are not merged (e.g. by a server computer) into a single extended place of relevance. In some arrangements, there may be a scope within a server computer for each label that defines the label as being "public" or "private." To avoid this problem merging of stationary places of relevance, discovery of extended places of relevance might only be done by a computing device with public labels, and not personal/private labels. The scope of the label may be pre-known or set by the user. In the latter case, a means of conflict resolution (e.g., a conflict resolution method) might be needed when multiple users choose a different scope for the same label.

FIG. 1A illustrates an example method of discovering and/or automatically sizing one or more extended places of relevance according to one or more illustrative aspects of the disclosure. According to one or more aspects, any and/or all of the steps of the example method illustrated in FIG. 1A may be implemented in and/or performed by one or more computing devices (e.g., computer system 120) that may be mobile and/or stationary depending on the embodiment. Additionally or alternatively, any and/or all of the steps of the example method illustrated in FIG. 1A may be stored in a computer-readable medium as computer-executable instructions that, when executed, may cause one or more computing devices to perform the example method.

In step 101 (FIG. 1A), a plurality of places of relevance may be identified. For example, in step 101, a computing device (e.g., computer system 120) may identify a plurality of places of relevance based on position data acquired by the computing device. Such position data may include one or more measurements of WiFi signals (called WiFi traces), motion classifications, step counts, direction information, sound fingerprints, and/or other position data and/or the like. Using such position data, the computing device may, for instance, determine that a particular area or location (which may correspond to one or more items of position data) is a place of relevance if the user (and/or the computing device) remains and/or remained stationary in the particular area or location for a sufficiently long period of time (e.g., if the time spent by the user in the particular area or location exceeds a threshold, such as 10 seconds). In some arrangements, other methods and/or steps may be used in addition to or instead of this one to identify a plurality of places of relevance.

In step 102, user input specifying one or more labels may be received. For example, in step 102, the computing device may receive user input (e.g., via one or more user interfaces) corresponding to a user assignment of one or more labels (e.g., semantic tags) to one or more places of relevance. For example, a user might label one place of relevance as "My Office," and the user might label another place of relevance as "Shopping Mall." One or more other labels may similarly be assigned by the user and/or received by the computing device.

In step 103, it may be determined whether the same label has been assigned to at least two places of relevance. For example, in step 103, the computing device may determine, based on the user input received in step 102, for instance, whether at least two places of relevance of the plurality of places of relevance have been assigned the same label. For instance, a user of the computing device might have labeled one place of relevance as "Morehouse Market" and another, perhaps nearby, place of relevance also as "Morehouse Market." Other methods and/or steps may be used in addition to or instead of this one to determine whether the same label has been assigned to at least two places of relevance.

For example, in some arrangements, labels may be assigned by different users. In the example above, for instance, a first user might have labeled a first place of relevance as "Morehouse Market," and a second user (different from the first user) might have also labeled a second, perhaps nearby, place of relevance also as "Morehouse Market." Additionally or alternatively, users might be able to designate whether a label applied to a place of relevance is public or private. Public labels may, for instance, be viewable by other users, and/or may be used by the system in discovering extended places of relevance, as described herein. On the other hand, private labels might not be viewable by other users, for instance, and/or might not be able to be used by the system in discovering extended places of relevance.

If it is determined, in step 103, that the same label has not been assigned to at least two places of relevance, then the method may end. On the other hand, if it is determined, in step 103, that the same label has been assigned (or similar labels have been assigned) to at least two places of relevance, then in step 104, it may be determined, based on one or more distance metrics (indicative of dissimilarity between measurements), for instance, whether the at least two places of relevance are adjacent and/or contiguous. According to one or more aspects, two places may be considered to be adjacent and/or contiguous if a test is satisfied indicating the places are within a certain distance of each other (e.g., less than 0.1 in distance, when the distance indicative of dissimilarity ranges between 0 and 1). Other methods and/or steps may be used in addition to or instead of this one to determine whether the at least two places of relevance are adjacent and/or contiguous.

Thus, continuing the example discussed above, the computing device may determine, in step 104, based on one or more distance metrics, whether the at least two places of relevance, e.g., the at least two places of relevance having a label ("Morehouse Market") are adjacent (e.g., within a certain distance of each other, in dissimilarity). For example, the computing device may compute, using the position data described above, for instance, the distance (indicative of dissimilarity) between measurements in the at least two places of relevance. For example, a computing device of some embodiments may determine, in step 104, based on comparing at least two centroids, whether corresponding two places are similar to one another.

Subsequently, if it is determined, in step 104, that the at least two places of relevance are not adjacent and/or contiguous, then the method may end. On the other hand, if it is determined, in step 104, that the at least two places of relevance are adjacent and/or contiguous, then in step 105, it may be determined that the at least two places of relevance define an extended place of relevance. For example, if the computing device determines that the at least two places of relevance in the examples discussed above (e.g., the places of relevance labeled "Morehouse Market") are adjacent and/or contiguous, then in step 105, the computing device may determine that the at least two places of relevance define an extended place of relevance. Hence, in such embodiments, the computing device stores in memory 110 (e.g. in a set of POR place models 135 of FIG. 4A), an extended place of relevance that includes at least these two places (e.g. in a list or a database, depending on the embodiment).

Figure 1B:
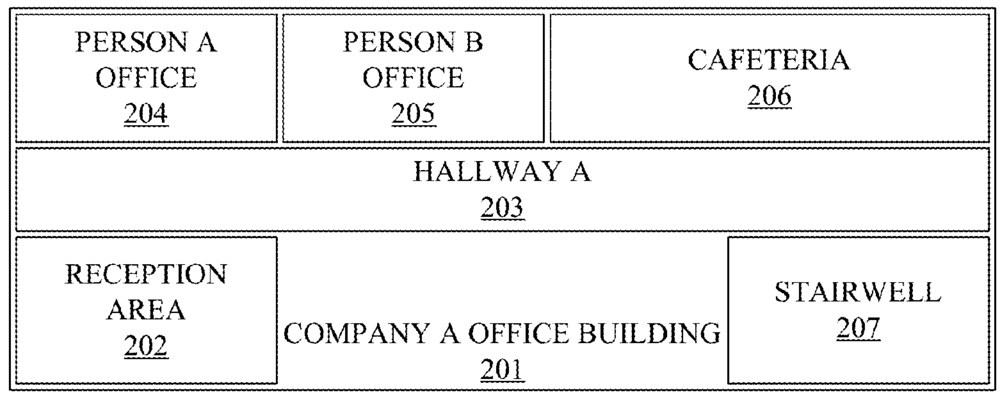
FIG. 1B illustrates on an indoor map, an example extended place of relevance, shown conceptually, according to one or more illustrative aspects of some embodiments in the disclosure.

FIG. 1B illustrates, on an indoor map, an example of an extended place of relevance, shown conceptually according to one or more illustrative aspects of the disclosure. As seen in FIG. 1B, a company's office building 201 may include various rooms, offices, spaces, and/or other areas, such as a reception area 202, a hallway 203, a first office 204, a second office 205, a cafeteria 206, and a stairwell 207. According to one or more aspects, while each of these rooms, offices, spaces, and/or other areas may be considered a place of relevance, together, these rooms, offices, spaces, and/or other areas may be defined by a computing device as described herein, as an extended place of relevance. In several embodiments, the computing device defines the extended POR based primarily on measurements, and without use of a layout of one or more buildings of the type shown in FIG. 1B. However, other embodiments do use a layout, indoor map, floor plan and/or other geographic information of one or more buildings that are interconnected, in combination with the measurements.

In some embodiments, a place of relevance (POR) may be defined by a sufficiently large number of WiFi measurements that fall within a certain distance around a center point (and satisfy a set of additional criteria). A new type of place of relevance, a "path," may now be defined as being given by a continuous walking segment. "Walking" may be defined through: (a) output of a motion classifier; and/or (b) continuous change in measurements of WiFi signals. "Continuous" may be defined by: (a) overall duration more than $t_{min}$, (b) with no interruption longer than $i_{max}$. From the above definition, it may follow that on a signal level, a Path is a sequence of WiFi measurements (values of signal strengths, and signal identifiers) collected over a period of time. If working with motion, computer system 120 may also have information on step count and direction (e.g., sequence of direct changes).

Accordingly, many methods of the typed described herein recognize and segment trajectories. The discussion below describes Paths and looks at a method that: (a) may be an extension of the Places method described above in reference to FIGS. 1A and 1B; (b) might start with WiFi traces only, but may easily incorporate motion classification, step counting, direction information, sound fingerprints, etc. (c) may focus on the problem of recognition of the reoccurrence of broadly defined paths (e.g., walking within a certain area, such as a supermarket, certain part of a mall, or a hall leading to a cafeteria) rather than accurate trajectory descriptions; (d) may be implemented with low computational complexity; (e) may allow path overlap to be considered on different spatial scales. Thus, for some applications, one may be interested in knowing that a person is walking within a specific building or a large supermarket. Thus, two paths that are within the same relatively large area may be considered matching. In others, one may look at a specific hallway (e.g., as an access route to a cafeteria or a conference room).

Figure 2A:
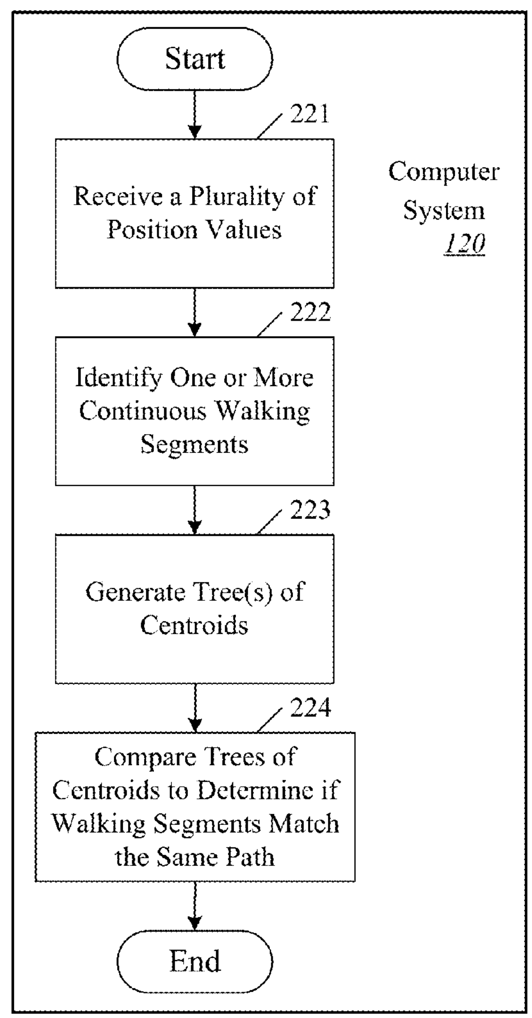
FIG. 2A illustrates an example method of discovering and/or automatically sizing one or more path-based places of relevance according to one or more illustrative aspects of some embodiments in the disclosure.

FIG. 2A illustrates an example method of discovering and/or automatically sizing one or more path-based places of relevance according to one or more illustrative aspects of the disclosure. According to one or more aspects, any and/or all of the steps of the example method illustrated in FIG. 2A may be implemented in and/or performed by one or more computing devices (e.g., computer system 120). Additionally or alternatively, any and/or all of the steps of the example method illustrated in FIG. 2A may be stored in a computer-readable medium as computer-executable instructions that, when executed, may cause one or more computing devices to perform the example method.

In step 221, a plurality of position values may be received. For example, in step 221, a computing device (e.g., computer system 120) may receive a plurality of position values. Such position values may include and/or consist of position data, similar to the position data described above. For instance, the position data may include one or more WiFi traces, motion classifications, step counts, direction information, sound fingerprints, and/or other position data and/or the like.

In step 222, one or more continuous walking segments may be identified. According to one or more aspects, "walking" may refer to motion as measured by output of a motion classifier and/or a continuous change in WiFi measurements, as further discussed below, and "continuous" may refer to motion having an overall duration greater than a first threshold (e.g., $t_{min}$), and/or without any interruption(s) longer than a second threshold (e.g., $i_{max}$). Thus, continuing the example discussed above, the computing device may identify one or more continuous walking segments based, for instance, on the received plurality of position values.

In step 223, one or more trees of centroids of measurements may be generated. For example, in step 223, the computing device may generate a first tree of centroids for measurements made on a first identified continuous walking segment and a second tree of centroids for measurements made on a second identified continuous walking segment. In one or more arrangements, each tree of centroids may include a plurality of levels. Methods and/or steps of generating one or more trees of centroids are further discussed below. Other methods and/or steps may be used in addition to or instead of these in generating one or more trees of centroids.

In step 224, the generated trees of centroids may be compared to determine if one or more identified continuous walking segments match the same path. For example, in step 224, the computing device may perform path matching (which may involve, for instance, recursively comparing corresponding levels of the generated trees of centroids of measurements), as further described below. Additionally or alternatively, the computing device may, for instance, perform similarity clustering (which may involve, for instance, separately clustering corresponding levels of the generated trees of centroids), as further described below.

Figure 2B:
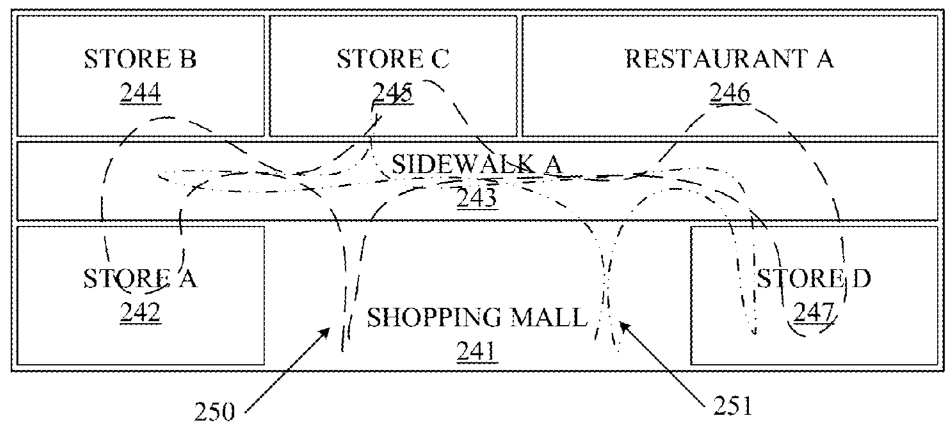
FIG. 2B illustrates on an indoor map, a path-based place of relevance, shown conceptually, according to one or more illustrative aspects of some embodiments in the disclosure.

FIG. 2B illustrates, on an indoor map, a path-based place of relevance, shown conceptually, according to one or more illustrative aspects of the disclosure. As seen in FIG. 2B, a shopping mall 241 may include various stores, restaurants, sidewalks, and/or other areas, such as a first store 242, a sidewalk 243, a second store 244, a third store 245, a restaurant 246, and a fourth store 247. Different people might take different paths when walking around shopping mall 241. For example, a first person might walk along path 250 (FIG. 2B), while a second person might walk along path 251 (FIG. 2B). Although the trajectories of the first person and the second person might be different in some ways, both the first person and the second person are walking around shopping mall 241. Thus, shopping mall 241 may be considered a loosely defined region where walking takes place, and accordingly, path 250 and path 251 may define a path-based place of relevance.

In several described embodiments, while a user is walking, a computer system 120 in the form factor of a mobile device (such as a smartphone) is carried by the user. Hence computer system 120 moves along a path on which the user is walking through an area. During such movement, computer system 120 measures one or more signals in an act 301 (FIG. 3A), such as a wireless signal transmitted by a wireless access point (WAP), and goes to act 302. In act 302, computer system 120 stores a tuple for a current WiFi measurement (e.g. an identifier of the signal being measured (such as an address of the source), a strength of the WiFi signal for a specific WAP, and then goes to act 303. In act 303, computer system 120 checks if all WiFi signals that are known and identified for measurement have been measured, to form the current measurement. At this stage, computer system 120 may make additional measurements to form tuples for additional WAPs, by returning to act 301, if all signals have not been measured for the current measurement.

When all signals for a current measurement have been measured, computer system 120 goes to act 304, and outputs all tuples of the current measurement and additionally a time stamp of the current time of the day e.g. for use by software (such as an app, an operating system, a driver, or dedicated software below the operating system) within computer system 120 or alternatively for use by software within a server computer to which computer system 120 is coupled.

Examples of measurements that are output in act 304 are shown in FIGS. 6B and 6C as a temporal sequence of measurements A1 . . . AI . . . AN that are made one after another successively (e.g. while a user is walking along a path "A" through an office 600 in FIG. 6B, starting from a cubicle 601 and ending in a break room 602) at every minute, e.g. at time 9.00 am, at time 9.01 am and at time 9.02 am respectively, as illustrated in FIG. 6C.

In several embodiments, computer system 120 is programmed to prepare a vector (also called "feature vector"), based on a current measurement (or WiFi trace). Dimensionality of such a vector may be automatically selected by computer system 120, based on the number of sources of WiFi signals that are being measured, and the received signal strength indicator (RSSI) value of each signal is used as a value of a dimension in the vector. In such embodiments, when a WiFi signal to be measured is not sensed, computer system 120 may be programmed to set a corresponding element in the vector to a lowest RSSI value possible (i.e. minimum of a range of RSSI values).

In several embodiments, after output of a measurement (and/or after generation of a vector) in act 304, computer system 120 goes to act 305. In act 305, computer system 120 of some embodiments then waits for (A) a change in the signals just measured or (B) a predetermined time period (e.g. once a minute), or (C) a combination of these two conditions (A) and (B). In some examples of condition (A) in act 305, computer system 120 may execute a similarity function to obtain a similarity measure or a distance of dissimilarity to compare vectors formed (as described above) based on measurements, to determine whether there has been a change.

In an example illustrated in FIG. 6C, measurements of wireless signals are made periodically, e.g. once every minute, although as will be readily apparent such measurements may be made at other time intervals, such as every 15 seconds, or every 5 minutes, and such a time interval may vary in some embodiments, e.g. based on battery power available to computer system 120 at the time of making a measurement. In some embodiments, when no change is detected between multiple measurements, act 305 may use the multiple measurements to obtain a centroid (as shown FIG. 6C), and the centroid may be used in identifying a place as described herein.

When a change is detected between measurements, computer system 120 evaluates whether the change is significant, e.g. by use of a threshold on similarity (e.g. see FIG. 4B) and if so, then computer system 120 returns to act 301 (described above). Thresholds of the type illustrated in FIG. 4B may be predefined for some applications (e.g. constants, which may be set based on experimental data). In other embodiments, the thresholds of FIG. 4B may be dynamic (e.g. derived based on optimization of to obtain best results), so that the thresholds can be different for different applications in computer system 120. For example, when noise of a signal/measurement (e.g. noise over time) is low (e.g. below another constant), a dynamic threshold on similarity that is used to detect the signal change (e.g. see FIG. 4B) may be relaxed by use of an optimization method, in certain embodiments of computer system 120. Use of dynamic thresholds may require computation and/or measurements, which have a drawback of draining the battery of computer system 120.

In some embodiments, a place of relevance is identified by processor 100 on finding a sufficiently large number of measurements that are similar around a point ("center point"), and further satisfy a set of additional criteria, such as similar labels and/or occurrence in a temporal sequence. In some embodiments, measurements of received signal strength (RSSI) of wireless access points (WAPS) are used to determine a similarity value in the following sense: given a set of measurements, how similar are these measurements to each other. Note that the just-described similarity value is more general than physical distance in the real world, as the similarity can be defined across non-linear spaces in the real world (e.g. across one or more walls in a building).

As noted above, some embodiments use measurements of WiFi signals to prepare vectors of n elements wherein each element (also called "dimension") represents the RSSI of a WiFi signal (e.g. as illustrated in FIG. 6C), and these vectors are then compared, e.g. using a similarity function. An example of an additional criteria that may be included in such a vector in some embodiments is based on a response rate of a source of the WiFi signal, i.e. Wireless Access Point (WAP), e.g. whether all WAPs are responding with a response reliability similar to one another. Hence, additionally or alternatively, several embodiments use a new type of place of relevance (POR), called a "Path" POR, based on measurements made when a user walks without stopping, in a segment (called "walking segment") of a path, as described below.

Figure 3A:
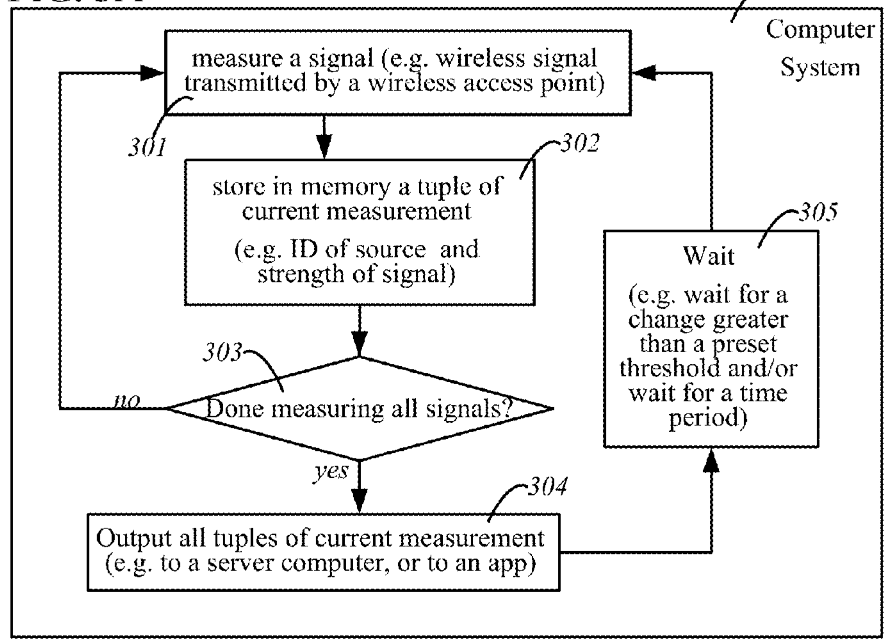
FIG. 3A illustrates in a high-level flow chart, acts performed by a mobile device 120 to make measurements of wireless signals while moving along a path, in some embodiments described herein.

Referring to FIG. 3A, output of a current measurement in act 304 described is received in an act 311 that is performed by processor(s) 100. Hence, several embodiments of processor(s) 100 implement a mechanism that uses as a model of a place of relevance (POR), measurements of a series of continuously changing signals that correspond to continuous walking segments in a path of a user. One or more of processor(s) 100 of some embodiments may be included in computer system 120, and depending on the embodiment some processor(s) 100 may be included in a server computer to which computer system 120 is coupled.

In several embodiments of the type illustrated in FIG. 3A, output in act 304 is done by execution of one piece of software (or "app") and receipt in act 311 is done by execution of another piece of software both of which are executed by a single processor 100, although as noted above in other embodiments such pieces of software may be executed by different processors 100. On receiving a current measurement in act 311, processor(s) 100 check whether certain predefined conditions are satisfied, indicating that a user that is carrying computer system 120 is actually walking along a path.

Figure 3B:
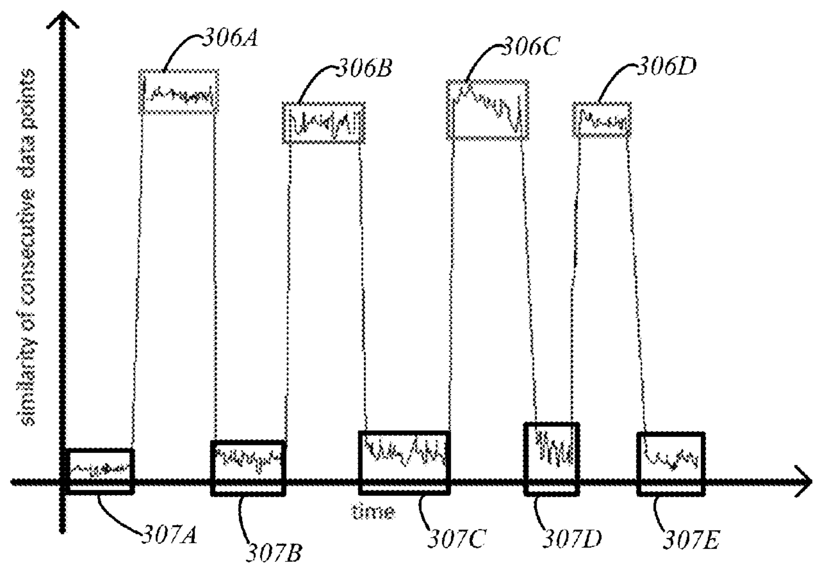
FIG. 3B illustrates, in a two dimensional graph, a plot of similarity on the Y axis (e.g. in the range 0 to 1), between measurements made over time, as a function of time of measurement along the X axis (e.g. in the range 0 to 10 minutes).

Predefined conditions that are checked can be different depending on the embodiment, although certain embodiments check for similarity of measurements that are made consecutively in time one after another, as shown in FIG. 3B. Specifically, FIG. 3B illustrates a graph where the vertical Y-axis represents similarity of consecutive WiFi measurements and the horizontal X-axis represents time. In FIG. 3B, a group of measurements that are made consecutively in time during a time interval 306A have a high similarity relative to one another, relative to other measurements such as measurements in time interval 307A. Hence, in such embodiments, based on high similarity between consecutive measurements, a determination is made by computer system 120 that the user is located in a single place (although moving around therein), during the time interval 306A. In other time intervals 307A, 307B, 307C and 307D (see FIG. 3B) computer system 120 determines the user to be moving between places, based on similarity between consecutive measurements being too low. Therefore, in several embodiments, the time at which each measurement is made is used by computer system 120, in automatically discovering or recognizing a place of relevance (POR), as described herein.

In FIG. 3B, four time intervals 306A, 306B, 306C and 306D are illustrated which have measurements of high similarity (in space). Therefore, these four time intervals 306A-306D are represented by computer system 120 as four visits by the user. For example, a first subset of measurements made sequentially in time relative to one another in a first visit during time interval 306A may be at the user's home, a second subset of measurements made sequentially in time relative to one another in a second visit during time interval 306B may be at a coffee shop on the user's way to work from home, a third subset of measurements made sequentially in time relative to one another in a third visit during time interval 306C may be at the user's office, and a fourth subset of measurements made sequentially in time relative to one another in a fourth visit during time interval 306D may be at a restaurant.

Each visit of the type described in the previous paragraph is modeled in a memory 110 (FIG. 4A) of computer system 120 of some embodiments, as a visit place model (VPM). Construction of visit place models reduces noise in some embodiments. Hence, in several embodiments of computer system 120, it is these visit place models (VPMs) that are clustered thereby to reduce noise (although other embodiments may cluster the WiFi measurements themselves). Use of visit place models is leveraged during extraction of PORs in some embodiments and enables computer system 120 to differentiate, e.g. between two offices that are adjacent to one another. Thus, use of visit place models as described herein lead to superior performance of a two-step process: a first step of construction of VPMs, and a second step of similarity clustering on the VPMs.

Referring to FIG. 3C, some embodiments of processor 100 are programmed to check (as per act 312) if a time difference between a current measurement and a prior measurement is greater than $i_{max}$ and if not goes to act 319 to store the current measurement in a current path and then returns to act 311. If the answer in act 312 is yes, then processor 100 goes to act 313 to check if the overall duration of the current path is more than $t_{min}$ and if not goes to act 318 which simply re-initializes the current path to null and returns to act 311. Act 313 is performed in some embodiments so that identification (in act 314, described below) is not performed when the user's walk has been so small as to be negligible and not worth analysis.

Accordingly, several embodiments determine that a user is walking, based on an overall duration of the user's walking segment lasting more than $t_{min}$ as measured between a first and last measurement in a temporal sequence of a subset of measurements, with no interruption longer than $i_{max}$ between any two consecutively made measurements. As noted above, the just-described conditions are checked in some embodiments, by a processor(s) 100 that receives a current measurement, as illustrated by acts 312 and 313 in FIG. 3C.

When the answer in act 313 is yes, processor 100 performs act 314 to identify a subset (or group) of measurements that occur sequentially in time relative to one another, e.g. measured along a segment of a path on which a user may be walking, thereby to identify a continuous walking segment. The measurements in the subset are identified in act 314, at least for satisfying a test on a value of a measure of similarity of all measurements included in the subset. Some embodiments of processor 100 may use as a measure of similarity (or similarity attribute), a value obtained by execution of a similarity function 180 on each measurement AI (FIG. 6C) and a centroid $C_1^A$ (of a temporal sequence of measurements A1 . . . AI . . . AN on path A), to identify the measurements A1 . . . AI . . . AN as forming a subset.

Figure 4C:
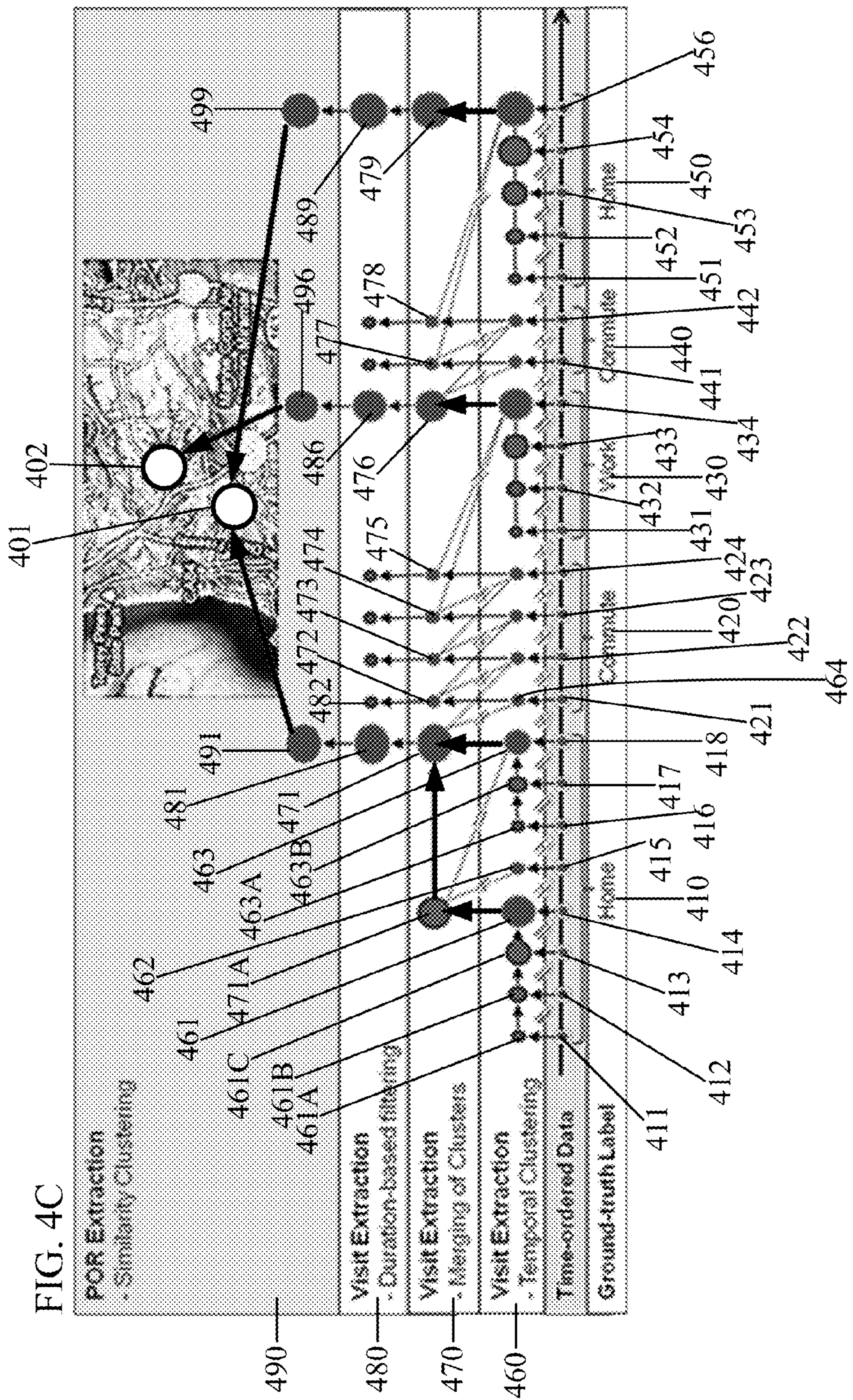
FIG. 4C illustrates, operation of the discovery system 130 of FIG. 4A in an example, by initially clustering WiFi measurements based on a time of measurement (e.g. as indicated by a time stamp) followed by merging of clusters to exclude outliers, followed by duration filtering to exclude measurements made during travel other than by foot, followed by similarity clustering to identify places of relevance (PORs), in some of the described embodiments.

Specifically, in some embodiments, a value of a measure of similarity, of each measurement AI to centroid $C_1^A$ is tested against a predetermined threshold (minimum similarity), and each measurement AI is included in the subset only when the test is satisfied. Examples of similarity function 180 (FIG. 4A) are Tanimoto, Dice, Jaccard, etc. Some embodiments use a distance metric indicative of dissimilarity, and this distance is obtained as follows: 1—similarity. Accordingly, in several methods of the type described herein, identification of a place having a centroid, is performed based on including in the subset only certain measurements based on their time of measurement, e.g. measurements that are made sequentially in time relative to one another as illustrated in FIG. 4C and described below.

A subset of measurements identified as per act 314 is then stored in a non-transitory memory 110 in act 315, followed by act 316 of checking if all subsets have been identified and if not control returns to act 312 (described above). When all subsets that satisfy a test on a value of a measure of similarity are identified, the answer in act 316 is yes, and control transfers to act 317 wherein the subsets are used. In some embodiments, act 317 compares each subset of the measurements resulting from act 314, with subsets of additional measurements (e.g. by clustering as illustrated in FIG. 5A and 5D), to identify a new place of relevance. In certain embodiments, act 317 compares each subset of the measurements resulting from act 314, with a pre-computed model of measurements (e.g. as illustrated in FIG. 5E), to identify a known place of relevance. In several embodiments, act 317 compares each subset of the measurements resulting from act 314, with additional measurements made in an additional path, e.g. to identify a place at which two paths cross one another. Accordingly, the specific use of the subsets of measurements in act 317 (e.g. to identify a path based place of relevance) depends on the embodiment, and after such use control transfers to act 318 (described above).

In identifying subsets of measurements in act 314, some embodiments of processor 100 use a minimum radius $d_{min}$ a smallest scale on which a model of a path is built. In some embodiments, act 314 starts with a set of measurements that are measured along a path and that are similar to one another, and repeatedly (and in some embodiments recursively) subdivides the set into subsets, until a stage is reached when measurements in adjacent subsets become separated by less than $d_{min}$ at which stage subdivision stops. In other embodiments, act 314 is repeatedly invoked as each new measurement is received, and determines whether or not the new measurement is to be added to a subset of measurements that are currently stored in memory 110, identified for satisfying a similarity test as per act 314 (described above).

The subset of measurements identified in act 314 constitute a sequence of WiFi traces collected over time. The time period of collection of the subset in some embodiments of processor 100 is designed to be greater than a predetermined threshold $t_{min}$.Depending on the embodiment, instead of or in addition to WiFi traces, computer system 120 may use in-built motion sensors to obtain information on step count and direction (sequence of direction changes). Accordingly, several embodiments recognize and segment certain measurements (such as WiFi traces) that are made along a user's path, although other embodiments incorporate other measurements, such as motion classification, step counting, direction information, sound fingerprints etc.

In some embodiments, one or more processors 100 executing software to perform act 312 (described above) constitute means for repeatedly identifying, from among a set of measurements made by a mobile device while moving in a path, a subset of the measurements that occur sequentially relative to one another along the path, the measurements in the subset being identified at least for satisfying a test on a value of a measure of similarity of all measurements included in the subset. Moreover, in such embodiments, one or more processors 100 executing software to perform act 315 (described above) constitute means for storing in a non-transitory memory, at least each subset identified by the means for repeatedly identifying.

In several embodiments of the type described herein, a subset of measurements that are identified in act 314 is used by computer system 120 to identify a user's visit to a place of relevance (POR). A place represents a physical location, with an expansion in space (e.g. as a circle or a square) in real world that has dimensions of a room in a building, e.g. office room 204 in an office (FIG. 1B), or a living room in a home, or a section of a store 244 (FIG. 2B). Such a place may be identified by computer system 120 by use of one or more measurements (e.g. of WiFi traces), to decide whether a user is in the same place.

Computer system 120 of some embodiments decides that the user is in the same place, without use of any type of map or layout or other geographic information, when the measurements are sufficiently similar to one another, e.g. when a distance metric (obtained by executing a similarity function 180, such as Tanimoto) is indicative of a test on dissimilarity between measurements being satisfied, e.g. distance less than 0.1 (or similarity greater than 0.9). Computer system 120 may then aggregate measurements that are similar (e.g. measurements A1 . . . AI . . . AN in FIG. 6C), by computing a centroid (e.g. centroid $C_1^A$). In an illustrative example shown in FIG. 6A, a single place is identified as having a centroid $C_1^A$ which is obtained by averaging (by taking an arithmetic mean of) signal strengths of multiple measurements, for each WAP.

As noted above, several embodiments of the type described herein do not use a map or a layout or a floor plan, or any other such geographic information, to identify in computer memory a specific place, which is identified in these embodiments only by comparison of measurements of wireless signals (and/or their centroids) using a similarity function to obtain a distance between measurements (as a dissimilarity metric, in a space wherein only the measurements are defined, also called measurement space). In an illustrative example, the wireless signals being measured are sounds, such as sounds commonly heard in a train station (e.g. a horn blown by a train). In the just-described example, geographic information (such as a map, layout or floor plan) about the train station is not used in several embodiments that automatically identify a place in the measurement space (in the space of sounds) as the train station and/or that determine two places (in the sound space) to be similar. Several embodiments of the just-described example store such places (identified in the sound space) in a list, to define an extended place as the train station, by using a similarity function to compare the sound measurements (vectors of strengths of audio signals at different frequencies). Alternative embodiments do use an outdoor map (e.g. at the level of streets of a city) and/or an indoor map (or layout) and/or any other geographic information and/or position (e.g. latitude and longitude from GPS) in combination with such wireless signal measurements to identify places, which in the real world occur in different physical locations, e.g. on opposite sides of a wall separating a user's office from a hallway or a bathroom.

A visit in some embodiments is defined as an interval of time during which a user remains continuously at the same place (i.e. within a predetermined distance (indicative of dissimilarity of measurements) from a centroid), although the user may be not stationary and instead may be walking around within a space that is identified as the same place. Hence, in several embodiments, a place of relevance (POR) is defined to be a place (e.g. a centroid of measurements and a distance of dissimilarity between measurements) that a user has visited at least $T_{minVisit}$ times (e.g. 2 times) and where each of those $T_{minVisit}$ visits exceeded a minimum duration of time $T_{minVTime}$ (e.g. 5 minutes).

Depending on the embodiment, a user might have to visit a place more than $T_{minVisit}$ times before the place is classified by computer system 120 as a POR. This is the case if one or more of the visits did not exceed the minimum duration of time $T_{minVTime}$. Both thresholds are tunable depending on the use case. In certain embodiments, a re-visit is determined by computer system 120 to be any visit by the user to a known POR (e.g. a place that was previously visited). Note that the definition of revisit in some embodiments does not require a user's visit to occur for any minimum duration of time, in order to constitute a revisit (even though a minimum duration is required in such embodiments, to automatically discover the user's visit, initially).

In several embodiments of the type described herein, a place model prepared by computer system 120 in memory 110 (FIG. 4A) captures certain predetermined characteristic of a place. Specifically, one or more characteristics (e.g. a centroid) are extracted by some embodiments of computer system 120 from WiFi measurements that are used to identify a place, and these characteristics are used thereafter to recognize that same place during a revisit by the user. Certain embodiments of computer system 120 model three types of places as follows: a place of relevance (POR place model), a place that has been visited previously (visit place model), and a place that has been identified by use of multiple measurements (instantaneous place model). Specifically, in several such embodiments, a POR place model (PPM) is used by computer system 120 to characterize a POR. In certain embodiments, a visit place model (VPM) is used by computer system 120 to characterize a user's visit. An instantaneous place model (IPM) is derived in some embodiments of computer system 120, from instantaneously collected WiFi measurements and captures characteristics of a current location of the user. However, from a technical point of view, these three place models are similar in the why and how a place is modeled by computer system 120.

In certain embodiments, a processor 100 in computer system 120 executes predetermined software to implement a discovery system 130 (FIG. 4A) in computer system 120, to identify new places in an unsupervised manner solely by analyzing a stream of raw sensor data, such as WiFi measurements. Discovery system 130 of many embodiments does not use any preexisting knowledge regarding the geographic location of a place or the size of spatial expansion of the place, on an indoor map, or layout, or floor plan. Moreover, in some embodiments, such raw sensor data is not segmented or annotated for input to discovery system 130, and ground truth (e.g. map data) regarding places and visits is not available to discovery system 130. Discovery system 130 of such embodiments operates mostly on a raw sensor data that may be filtered to remove inaccuracies, by a filter 139 (FIG. 4A). The output of discovery system 130 of some embodiments is a set of places of relevance, with their associated POR place models. These POR place models are then used as input by a recognition system 150 (see FIG. 4A).

In several embodiments, discovery system 130 (FIG. 4A) includes modules 131 and 132 that perform a two step process as follows. In a first step of the process, module 131 of discovery system 130 extracts all visits with a minimum duration of time $T_{minVTime}$ including their visit place models. In a second step of the process, module 132 of discovery system 130 (FIG. 4A) extracts PORs by clustering the previously extracted visit place models. The clusters are analyzed by another module 133 and each cluster containing more than $T_{minVisit}$ visit place models (respectively visits) is labeled as a POR, e.g. an extended POR or a path-based POR as described above. In this manner, discovery system 130 generates a set of POR place models 135 (FIG. 4A). In some embodiments, discovery system 130 implements constraints regarding the duration of visits and the number of visit place models in a cluster, based on the definition of a POR as described herein. The set of POR place models 135 typically grows over time, as more measurements are received by discovery system 130, resulting in more places being discovered as being PORs.

A split in implementation of clustering by discovery system 130 (FIG. 4A), into two steps as just described provides several advantages. The first step of the two step clustering process is based on temporal clustering and extracts visits as well as corresponding visit place models (VPMs). The second step of the two step process clusters the visit place models (VPMs) received from the first step, based on similarity, to determine places of relevance (PORs). The two-step clustering process is believed to be an improvement over a single step process where similarity clustering may be done directly on raw WiFi measurements, which can generate errors. In an example wherein two neighboring offices are visited, raw measurements (e.g. WiFi traces) are equally distributed over an entire region of both offices. In this example, a single step clustering process may merge measurements from the two offices into one cluster, and identify one place (both offices together). This error arises from performing clustering in a single step, based solely on spatial features, e.g. location features (latitude and longitude).

However the above-described two step clustering process by discovery system 130 (FIG. 4A), with temporal clustering to identify VPMs in the first step, followed by similarity clustering to identify PORs in the second step, uses certain additional information that is extracted from the WiFi measurements. Specifically, discovery system 130 (FIG. 4A) uses a time of collection of each WiFi measurement, as additional information in a first step of temporal clustering. Hence, discovery system 130 of some embodiments processes two WiFi measurements that are similar in both space and time, in a first step as having been collected during a single visit, and only then clusters these two WiFi measurements together, to generate a single VPM. Multiple VPMs are then compared to one another, in the second step of clustering and if dissimilar they are not merged (e.g. two neighboring offices are discovered to be distinct PORs).

Discovery system 130 of some embodiments implements one or more of the following three features. First, a place p is identified in some embodiments of computer system 120 by a place model $pm_p$ which captures characteristic information contained in data points (or WiFi measurements) acquired in real world that are represented by place p. Second, a place model $pm_p$ is constructed in computer system 120 and updated based on raw data points (or WiFi measurements) in certain embodiments. Third, a similarity function $f_{sim}$ ($pm_{p1}$, $pm_{p2}$) is used in computer system 120 of several embodiments to assess similarity of two place models. By use of these three features, discovery system 130 of some embodiments discovers extended PORs, path-based PORs, and also recognizes revisits, as described below.

In some embodiments, discovery system 130 (FIG. 4A) uses one or more thresholds of the type illustrated in FIG. 4B. Specifically, discovery system 130 categorizes parameters into two parts: place discovery parameters and place recognition parameters. Several of these parameters are used by discovery system 130 to model places of relevance (PORs). More specifically, the discovery of places of relevance is decomposed by discovery system 130 into two steps: a first step extracts visits and their corresponding visit place models (VPMs), and a second step clusters the visit place models (VPMs), extracts PORs and their corresponding POR place models. These two steps are described below, in reference to an example illustrated in FIG. 4C.

In the example of FIG. 4C, a user follows a sequence indicated by ground-truth labels as follows: home 410, commuting 420, work 430, commuting 440, and then back at home 450. Ideally, discovery system 130 extracts three visits as part of a first step of visit extraction (e.g. home 410, work 430 and home 450) and two PORs as part of the second step of POR extraction (e.g. home 410,450 and work 430). In this example, a number of WiFi measurements 411, 412, 413, 414, 415, 416, 417, 418, 421, 422, 423, 424, 431, 432, 433,434, 441, 442, 451, 452, 453, 454, 455, 456 are received by discovery system 130 in temporal order from communication subsystem 122 (FIG. 4A), as identified by a measurement time stamp therein.

Discovery system 130 processes these measurements at several levels 460, 470, 480 and 490 (FIG. 4C). Specifically, measurements 411-414 are propagated to one level 460 of temporal clustering, and merged into a node 461 because these nodes occur sequentially in time and all belong to the same place (as their measurements are similar to one another). Node 461 is then propagated to a higher level 470 of merging clusters, as node 471A. Similarly, nodes 471A and 471 at level 470 are merged (as their centroids are similar to one another), and propagated to a still higher level 480 of duration-based filtering, as node 481. Nodes 481, 486 and 489 at a level 480 are of sufficient duration (e.g. more than 5 seconds), and hence propagated to a further higher level 490 of similarity clustering, as nodes 491, 496 and 499 respectively. Nodes 491 and 499 are merged (e.g. based on having the same label "home"), to form node 401 which may then be identified on an outdoor map (in certain embodiments that use maps at the scale of streets in a city), while node 496 is not merged (e.g. based on having a different label "work") and becomes node 402 on that outdoor map. Accordingly, at this stage, two nodes 401 and 402 have been identified as places of relevance (and in the few embodiments, mapped to an outdoor map, e.g. a street-level map). The manner in which nodes are propagated and merged depends on the embodiment, and several such embodiments are described below. In FIG. 4C, the size of the nodes indicates the number of data points (or WiFi measurements) represented by the node. The arrows between nodes in FIG. 4C indicate the flow of data.

Discovery system 130 of some embodiments extracts visit place models from instantaneous place models, using a temporal clustering module 131 in combination with cluster merging module 132 and duration filtering module 133

(FIG. 4A). Specifically, temporal clustering module 131 extracts visits from the data points (or WiFi measurements), as illustrated by pseudo code in FIG. 5A. Temporal clustering module 131 represents all data points in a one-dimensional space, of time. This clustering technique is based on linear clustering which is a clustering technique used in database index theory where multi-dimensional data is represented in a one-dimensional space (table). This general idea is applied by discovery system 130 to perform clustering along the time dimension.

Discovery system 130 of some embodiments performs temporal clustering in module 131 such that the following constraints hold: two data points (or WiFi measurements) are clustered into the same node if and only if they share sufficient similarity (with respect to a similarity function and a similarity threshold $T_{tempClust}$) and if all of the data points between them (with respect to time) are also assigned to this same node. As a result, in some embodiments, a node represents an interval of time where at least a majority of data points (i.e. >50%) over the duration of the interval share at least a certain similarity (with data points that are dissimilar being filtered out, or otherwise excluded). Hence in this domain each time interval constitutes a visit.

Level 460 in FIG. 4C illustrates operation of the temporal clustering module 131. Specifically, data points (or WiFi measurements) are evaluated in temporal order, as to whether or not they are similar to a current node in level 460. For example, in FIG. 4C, data of an initial measurement 411 is propagated into level 460 to form a new node 461A, and then the next data point 412 is checked for similarity to node 461A. On finding that the data point is similar enough (w.r.t. threshold $T_{tempClust}$), the node and the data point are clustered, else a new node is started, as described below in reference to FIG. 4C.

Specifically, as indicated in FIG. 4C, a first node 461A at level 460 is found to be similar to a second data point 412 and therefore they are clustered to form node 461B, which is shown larger to illustrate that it now represents two measurements. A centroid of node 461B (e.g. a vector mean of WiFi traces of the two measurements) is then compared with a third data point 413 and found to be similar (e.g. within a predetermined distance of dissimilarity from one another) so they are clustered to form node 461C. A centroid of node 461C is then compared with a fourth data point 414, and found to be similar and therefore they are clustered to form node 461. Next, a centroid of node 461 is similarly compared with a fifth data point 415 and found to be different and so they are not clustered. Instead, a second node 462 is started in level 460 based on fifth data point 415.

Nodes 461A-461C are three versions of the same node 461 (at three earlier points in time), and therefore at this stage there are two nodes 461 and 462 in level 460. Node 462 is next compared with a sixth data point 416 and found to be different and so they are not clustered. Instead, a third node 463A is started in level 460, based on sixth data point 416. Next, node 463A is compared with a seventh data point 417 and found to be similar and therefore they are clustered to form node 463B. Then a centroid of node 463B is compared with an eighth data point 418, and found to be similar and therefore they are clustered to form node 463. Next, a centroid of node 463 is compared with a ninth data point 421 and found to be different and so they are not clustered. Instead, a fourth node 464 is started in level 460 based on ninth data point 421.

Hence, when temporal clustering module 131 (FIG. 4A) has processed the WiFi measurements 411-418, 421-424, 431-434, 441-442, 451-456 in the above described manner, level 460 has a total of eleven nodes in memory 110. Accordingly, due to temporal clustering, the eleven nodes at level 460 indicate eleven visits (some of which can be very short visits, such as node 464 which represents a measurement made during commute). In the example of FIG. 4C, these eleven nodes are processed by cluster merging module 132, which excludes outliers that may potentially split visits, due to their dissimilarity to consecutive data points. Specifically, a challenge presented by outliers in the WiFi measurements is that they cause temporal clustering module 131 to introduce artificial splits into visits. This is caused as outliers don't share enough similarity with their direct neighbors (neighbors in the dimension of time).

For example, FIG. 4C shows that WiFi measurements 411-418 all of which are made in home 410 have been clustered into three nodes 461, 462 and 463 at level 460, which represent three visits, although the user is located in only one place (home 410). This is caused by dissimilarity between the centroid of node 471 and the fifth data point 415. Since the fifth data point 415 was collected at home 410 (according to ground truth), the fifth data point 415 should have been properly identified as an outlier. However, this outlier 415 needs to be removed by discovery system 130 without knowing the ground truth, which is implemented by cluster merging module 132, as illustrated by pseudo code in FIG. 5B.

In some embodiments, cluster merging module 132 combines any two nodes in level 460 (which represent visits) if and only if their similarity is smaller than threshold $T_{mergeSim}$ and the time gap between them is less than threshold $T_{mergeTime}$. As a result visits which have been previously split due to outliers are fused to a single visit. In the example illustrated in FIG. 4C, cluster merging module 132 propagates the node 461 initially to level 470 to form node 471A, and a centroid of this node 471 is then compared with the centroid of node 462 at the level 460. Recall that the nodes 461 and 462 were too dissimilar which is why node 462 was initially started by temporal clustering module 131, and in doing so split the visit at home 410.

On finding no match, at this stage cluster merging module 132 compares the centroid of node 471A with the centroid of a third node 463 at the level 460. In this example, cluster merging module 132 finds a match, because the nodes 461 and 463 at level 460 are found to be similar in space (they will be similar, because the underlying measurements 411-414, 416-418 were made in the same place, home), and they are also found to be close to one another in time (as these measurements 411-414, 416-418 were all made in a single visit to the same place). Accordingly, in response to finding a match, cluster merging module 132 merges third node 463 at the level 460 with the node 471A to obtain the node 471 at level 470. Note that node 471 does not include any contribution from measurement 415, which is therefore effectively filtered out by discovery system 130, as an outlier.

Next, a centroid of node 471 is compared with node 464 and found to be different and so they are not clustered. Instead, cluster merging module 132 propagates the data of node 464 to form node 472 at level 470. Then node 472 is compared with the node (not labeled) that follows node 464 in level 460 and no match is found, so cluster merging module 132 propagates the data to form node 473 at level 470. In this manner, additional nodes 474, 475, 476, 477, 478, 479 are formed at level 470. Thus, when cluster merging module 132 (FIG. 4A) completes processing the eleven nodes of level 460, a total of nine nodes 471-479 are present at level 470, as illustrated in FIG. 4C and these nine nodes are then propagated to level 480.

Several embodiments of discovery system 130 include a duration filtering module 133 that applies thresholds specified as durations, to exclude visits that are too short or otherwise do not qualify to be identified as a place of relevance. Some embodiments of duration filtering module 133 implements a definition of PORs based on visits which exceed a minimum duration of time $T_{minVTime}$. Specifically, duration filtering module 133 filters nodes (which represent visits) at level 480 based on their duration, as illustrated by the pseudo code in FIG. 5C such that all remaining visits exceed the minimum duration of time $T_{minVTime}$. In the example of FIG. 4C, a visit 482 is too short, as it arises from a measurement made during commute. Hence, when module 133 completes its processing, only nodes 481, 486 and 489 remain, with the rest of the nodes in level 480 being filtered out. Therefore, the data of these three nodes 481, 486 and 489 is propagated to the next level 490 to form nodes 491, 496 and 499.

Several embodiments of discovery system 130 also include a POR extraction module 134 (FIG. 4A) that uses a similarity function 180 to compare the nodes at level 490 to one another, now independent of time of measurement, in order to identify places of relevance. Use of POR extraction module 134 after use of modules 131, 132 and 133 as described above overcomes several drawbacks in other designs. For example, similarity clustering directly on raw data points does not expose information regarding the duration of a visit. Similarity clustering on raw data identifies a cluster for each place and the number of data points in each cluster. Assuming uniform sampling, the number of data points is proportional to the accumulated time spent at each cluster or respectively place. However, how time is accumulated in each place is unknown and thus not used. Similarity clustering over the data points exposes places (clusters) where the user spends time, but without exposing information on whether the user spends time continuously (e.g. at a work) or accumulates a lot of time over multiple very short visits (e.g. traffic light on the way to work).

Challenges of the type described in the previous paragraph are addressed by use of POR extraction module 134, after temporal clustering module 131. Moreover, as noted above, all nodes at level 490 have already been processed by duration filtering module 133 and therefore these nodes represent visits that exceed a minimum time duration required by the definition of PORs. Hence, extraction of PORs from nodes at level 490 by POR extraction module 134 is based on similarity clustering over all visit place models that are identified by duration filtering module 133, as illustrated by pseudo code in FIG. 5D.

Several embodiments of discovery system 130 use a threshold $T_{simClust}$ to perform similarity clustering recursively. This clustering approach assumes that a number of clusters or nodes is not given, but a threshold is given. Specifically, the number of clusters or nodes that are identified by discovery system 130 is driven by the data points or WiFi measurements. The advantage of this approach is that clusters can be dynamically added by discovery system 130 without rerunning the entire clustering process. Conceptually, a node representing a visit by a user is clustered (or combined) with whichever node (or cluster) is most similar, but only when a threshold $T_{simClust}$ is not exceeded by the similarity measure (generated by use of similarity function 180). In the case where the threshold $T_{simClust}$ is exceeded, a new node or cluster is started by POR extraction module 134. After completion of similarity clustering as described above, all resulting nodes (or clusters) are analyzed, as to whether or not they qualify as a POR. Clusters which contain at least $T_{minVisit}$ visits represent a POR (where $T_{minVisit}$ is determined by the parameter in the definition of PORs). In the example illustrated in FIG. 4C, threshold $T_{minVisit}=1$ and thus POR extraction module 134 clusters three visit place models (home 491, work 496, home 499) and outputs two PORs 401 and 402.

Several embodiments of computer system 120 also include a recognition system 150 (FIG. 4A) that interoperates with discovery system 130. Recognition system 150 determines whether or not a revisit occurs. As shown in the pseudo code in FIG. 5E, input at start up time to recognition system 150 is a set of PORs represented by their POR place models. This set can be updated at any time and the update becomes effective starting from a next recognition step after the update was performed. The input at each recognition step of recognition system 150 is a current visit outputted from cluster merging module 132 which extracts visits from WiFi measurements. Based on the current visit recognition system 150 determines if a revisit to one of the PORs is present or not. In the case of a revisit, recognition system 150 outputs the identifier of the POR otherwise it indicates that no revisit has been recognized. In some embodiments, recognition system 150 computes a confidence value, representing the confidence of the recognition decision.

Some embodiments of recognition system 150 use incremental information from cluster merging module 132 about a current visit at each time step (instead of waiting for a complete visit to be identified) by maintaining an internal state variable which can be in one of two states: "enter" or "exit". The internal state "enter" indicates an ongoing revisit and "exit" that no revisit is recognized (or the previous revisit has ended and no new revisit has started). Recognition system 150 transitions from state "exit" to "enter" if two conditions hold true: The ongoing visit has to exceed time threshold $T_{recogEnter}$ and by similarity the visit has to be identified as a visit to a known POR.

Hence, some embodiments of recognition system 150 monitor intermediate results of discovery system 130 and when the two conditions become true, a revisit is marked in memory 110 as having been detected. After recognition system 150 transitions into state "enter" it reports a revisit by returning the identifier of the POR, at each recognition step. After a transition occurs, and recognition system 150 is in state "enter", it monitors the visit that caused the transition. Given there are no outliers and the user stays at the same location, a monitored visit grows in time with each recognition step. The revisit ends in some embodiments, when a terminating condition is met: the time duration between the monitored visit and the current time exceeds a predetermined time threshold $T_{recogExit}$. This terminating condition prevents recognition system 150 from dropping in and out based on outliers. For instance, if a current data point or measurement is an outlier, recognition system 150 does not output −1 indicating no revisit.

Therefore, some embodiments of recognition system 150 tolerate an outlier, and report a POR indicator as long as the time duration to the monitored visit doesn't exceed time threshold $T_{recogExit}$. Some embodiments of recognition system 150 use both time thresholds, $T_{recogEnter}$ and $T_{recogExit}$ to report a revisit being entered and exited. Use of such thresholds introduces an intrinsic tradeoff between latency and accuracy. The larger the time thresholds the lower is the chance of misclassification due to an outlier, however, the entry and exit of a revisit is detected with an increased latency.

Some embodiments of recognition system 150 provide a confidence value to express the recognition decision. The confidence value computation is based on the difference between two most similar places, as follows:

$$C(pm_v, pm_1, pm_2) = \frac{f_{sim}(pm_1, pm_v) - f_{sim}(pm_2, pm_v)}{f_{sim}(pm_1, pm_v) + f_{sim}(pm_2, pm_v)},$$

where $pm_1$ and $pm_2$ are the POR place models of the two most similar PORs and $pm_v$, the visit place model of the monitored visit.

Several embodiments of computer system 120 include a similarity function 180 that is used by either or both of recognition system 150 and discovery system 130. Similarity function 180 can be implemented in many different ways, depending on the embodiment. Some embodiments similarity function 180 implements Tanimoto similarity due to its superior performance in experiments. The Tanimoto similarity measures similarity between two feature vectors ($fv_a$ and $fv_b$) as follows:

$$Tanimoto(fv_a, fv_b) = \frac{fv_a \cdot fv_b}{\|fv_a\|^2 + \|fv_b\|^2 - fv_a \cdot fv_b} \in [0, 1]$$

The feature vectors are computed by computer system 120 from RSSI values of a place model. Given place model $pm_x$ of place x,$rssi_{x,i}^{avg}$ denotes the average RSSI value of Wireless Access Point $ap_i$. Then, Tanimoto similarity is calculated as follows.

$$f_{sim}^{tanimoto}(pm_a, pm_b) = \frac{\sum_{i=1}^{n} x_{a,i} \cdot x_{b,i}}{\sum_{i=1}^{n} x_{a,i}^2 + \sum_{i=1}^{n} x_{b,i}^2 - \sum_{i=1}^{n} x_{a,i} \cdot x_{b,i}}$$

where $x_{a,i}=rssi_{a,i}^{avg}+101$. Note that the RSSI value is transformed from a space of [−101, 0] to a space of [0, 101] in order to make the length of each feature zero when the RSSI value is −101. Given that an Wireless Access Point $ap_j$ is only contained in one of the two place models, it may be added to the other place models $pm_o$ and then set $rssi_{o,j}^{avg}=-101$.

Various embodiments of processor 100 are programmed to recognize in WiFi measurements, reoccurrence of paths or walking segments that results from a user walking within a certain area such a supermarket, certain part of a mall or a hall leading to a cafeteria. Many embodiments of processor 100 are programmed to identify an overlap of paths, on different spatial scales. For some applications, embodiments of the type described herein determine that a user walked within a specific building or a large supermarket. In some such embodiments, two paths that are within a common relatively large area (e.g. cafeteria) are identified by processor 100 as matching. In other applications, certain embodiments of processor 100 identify a specific hallway (e.g. as access route to a cafeteria or a conference room) from WiFi measurements along a path.

Figure 6A:
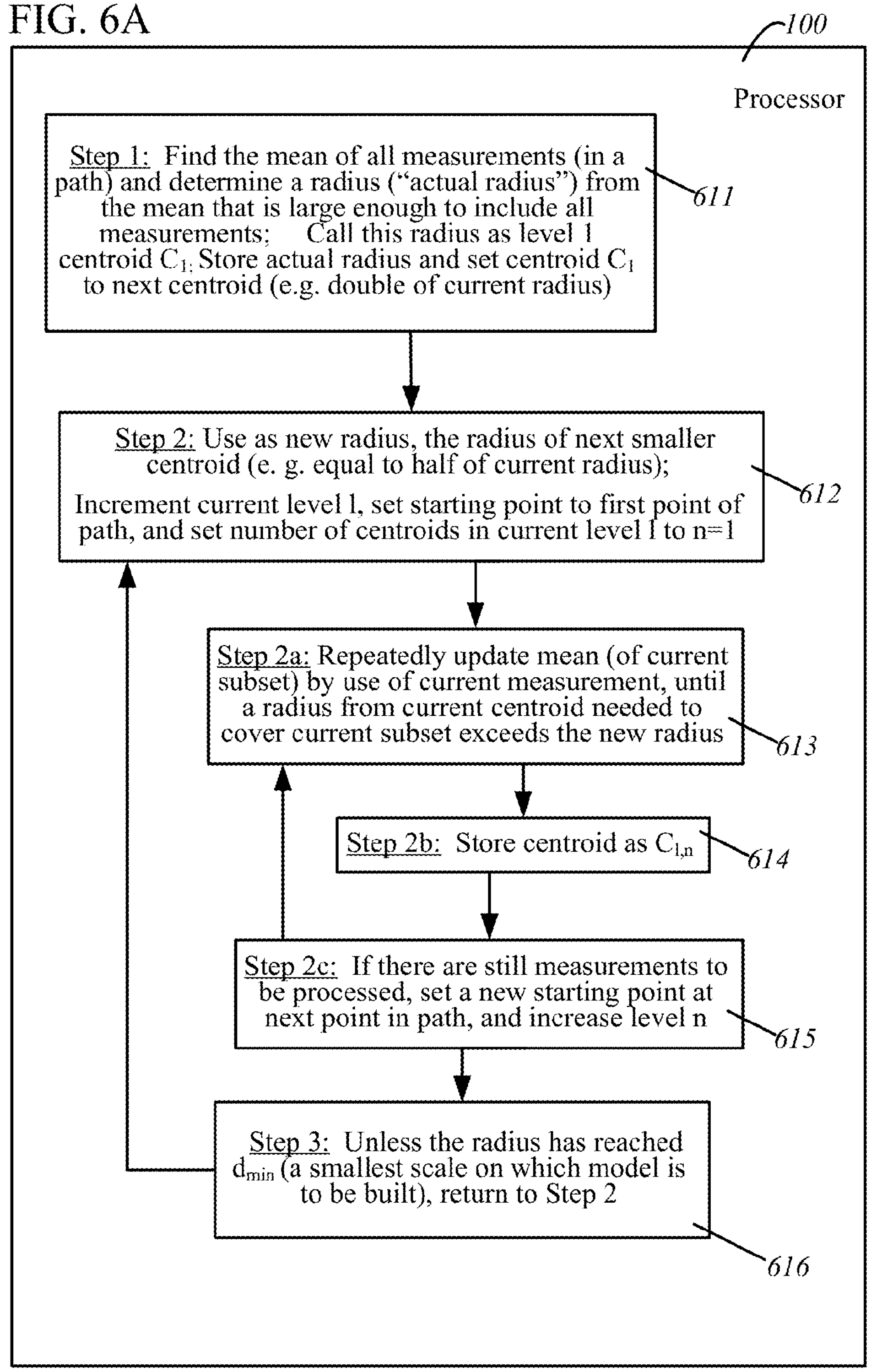
FIG. 6A illustrates in a high-level flow chart, additional acts performed by a processor 100 of computer system 120 of FIG. 4A, in some of the described embodiments.
Figure 6E:
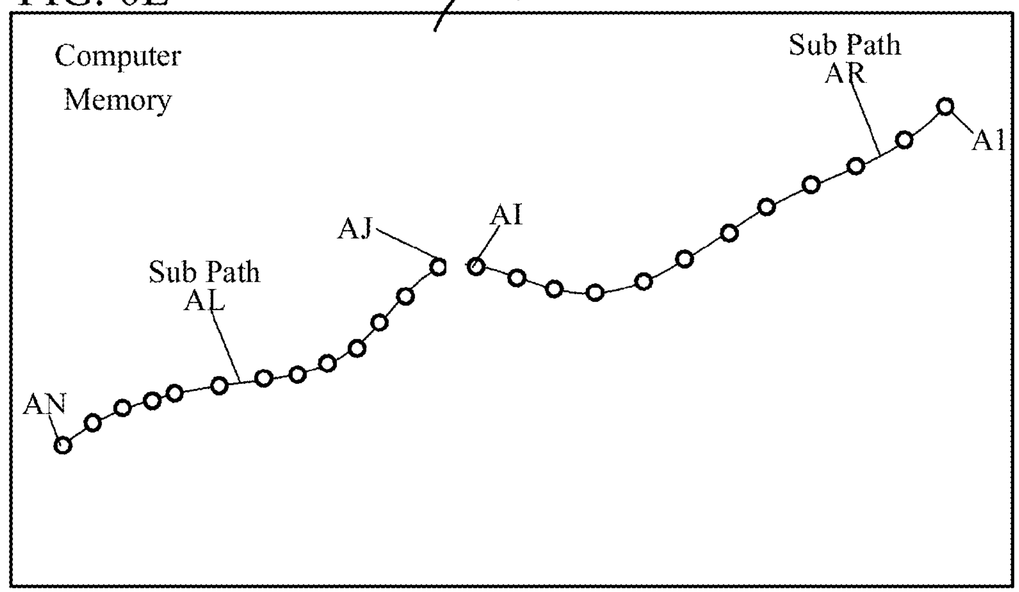
FIG. 6E illustrates, in memory 110, two portions of path A in FIG. 6B, as sub-paths AL and AR that are formed by use of a similarity measure to form two subsets of measurements namely measurements A1-AI and measurements AJ-AN respectively.
Figure 6F:
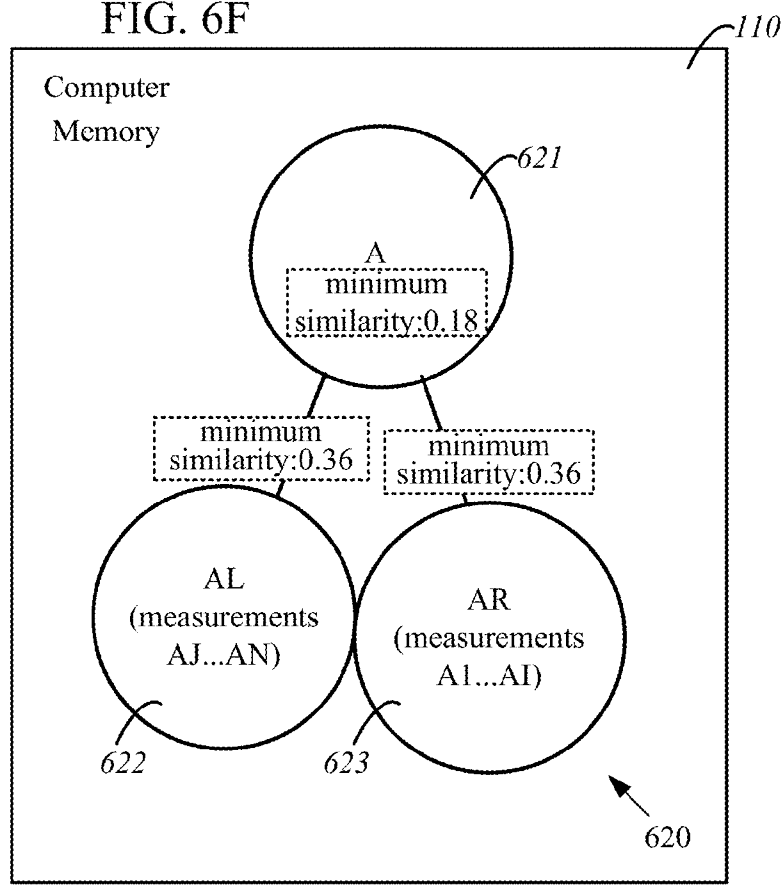
FIG. 6F illustrates a tree 620 formed by root node 621 and its child nodes 622 and 623 based on the two subsets A1-AI and AJ-AN illustrated in FIG. 6E.

Accordingly, several such embodiments of processor 100 are programmed to generate a hierarchy of levels represented by a tree of centroids, each centroid being assigned a radius that is double the previous level's radius (other embodiments use something else than doubling), as illustrated in FIG. 6A and described below in reference to Steps 1, 2 and 3. In Step 1 (see act 611 in FIG. 6A), a processor 100 is programmed to find a vector mean of WiFi traces, and determine how large a radius needs to be, to include the measurements along a path (this may be called the level 1 centroid C1). A radius that is identified as described herein in reference to FIGS. 6A-6H may be later changed (i.e. re-sized) as described herein in reference to FIGS. 9A-9F.

In some embodiments, each measurement is represented by a vector (as noted above), and therefore the vector mean is obtained by averaging the values in each dimension across the vectors (of the measurements). More specifically, as noted above, each measurement includes a specific group of identifiers of transmitters of wireless signals and strengths of the wireless signals received from the transmitters identified in the specific group. In certain embodiments, a centroid $C_1^A$ is formed by processor 100 to include a group of averages corresponding to wireless transmitters identified in a specific group, such as the transmitters named Orange, Blue, Green and Red, as illustrated in FIG. 6C.

Each average described in the previous paragraph is computed by processor 100 for each wireless transmitter identified in a specific group, across the strengths of a corresponding wireless signal from the each wireless transmitter measured in making the measurements. For example, for the transmitter named Orange, the values 52, 54 and 56 are used to prepare their arithmetic mean, namely 54 which is then used as the first member of a vector of centroid $C_1^A$. Similarly, for the transmitter named Red, the values 68, 66 and 68 are used to prepare their arithmetic mean, namely 67.3 which is then used as the last member of the vector of centroid $C_1^A$. Note that the start time 9.00 am and the end time 9.02 am of a visit represented by centroid $C_1^A$ are automatically assembled by processor 100 from the earliest time and the latest time of the measurements that are included in this subset.

At this stage, processor 100 may store the actual radius and at the same time also set $C_1$ to the next bigger centroid for use as a comparison metric. In some embodiments a similarity measure is determined, e.g. as inverse of a difference between each measurement and the centroid (see FIG. 6B) and the smallest similarity measure among all measurements is stored as a minimum similarity for a root node 621 of a path A (see FIG. 6D, similarity measure of 0.18 for path A). In some embodiments, such a similarity measure may be used to represent an expansion that is used to define a place.

In Step 2 (see act 612 in FIG. 6A), several such embodiments use the radius of the next smaller centroid (e.g. equal to half the current radius) as new radius, increase the current level number to 1, set the start point to the first point of a walking segment and set the number of centroids on level 1 to n=1. In embodiments that use a similarity measure, the value stored for the root node is doubled (see FIG. 6F, value 0.36 for sub paths AL and AR illustrated in FIG. 6E). Looping around this step 2, certain embodiments then perform Steps 2_a_, 2_b_ and 2_c_ (see FIG. 6A) as follows.

In Step 2_a_ (see act 613 in FIG. 6A), these embodiments go point by point updating the mean until a stage is reached where the radius needed to cover all the points (including the next point) exceeds the new radius (and when this happens that next point is not included). See the example of FIGS. 6D and 6E, wherein the minimum similarity of 0.36 was used to form a subset of points A1-AI thereby to identify sub path AR, from among all points A1-AN in path A.

Next, in Step 2_b_ (see act 614 in FIG. 6A), such embodiments then store the centroid as $C_{1,n}$ (e.g. store the mean, since the radius is given by the centroid corresponding to this level). Next, in step 2*c* (see act 615 in FIG. 6A), such embodiments check if there are still points left in the Path and if so set a new starting point at the next point in the Path increase n and return to step 2*a* (see act 613 in FIG. 6A). In Step 3 (see act 616 in FIG. 6A), several such embodiments check whether the radius has reached $d_{min}$ and if not, repeat step 2.

Figure 6G:
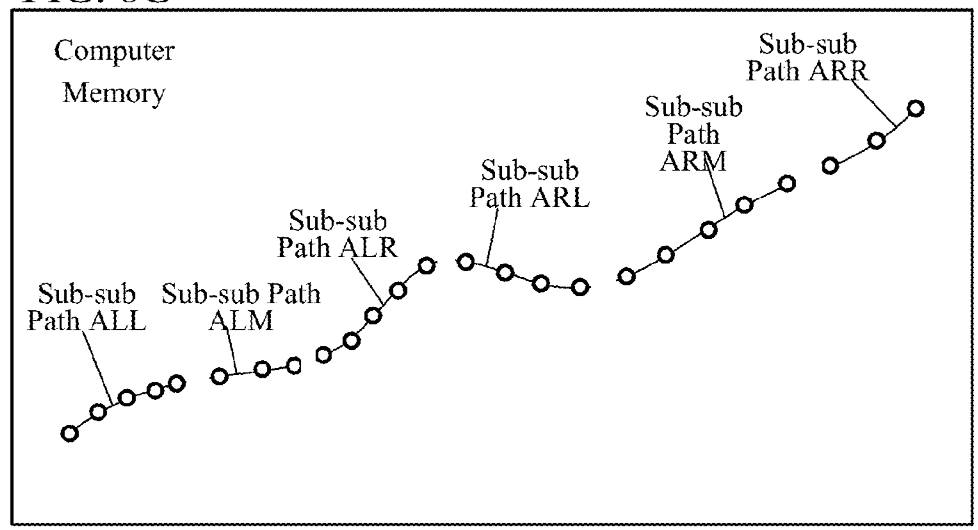
FIG. 6G illustrates, in memory 110, six portions of path A in FIG. 6B, as sub-sub-paths ALL, ALM, ALR, ARL, ARM and ARR that are formed by use of a similarity measure to form three subsets of measurements within each of the two subsets A1-AI and AJ-AN illustrated in FIG. 6E.
Figure 6H:
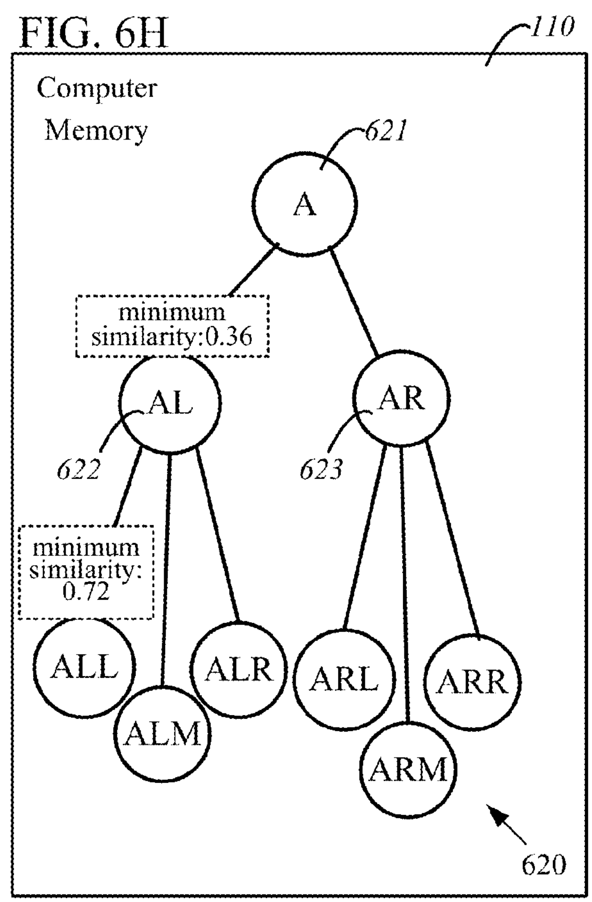
FIG. 6H illustrates the tree 620 of FIG. 6F now augmented to include nodes for the six portions (and consequently six subsets) illustrated in FIG. 6G.

The above-described procedure of Steps 1-3 produces a tree of centroids as a Path model of the type illustrated in FIG. 6H, which divide up a path A of FIG. 6B into six sub-sub paths ALL, ALM, ALR, ARL, ARM and ARR of FIG. 6G. Depending on the embodiment, there are many improvements in the above-described procedure that would be readily apparent to the skilled artisan. For example in one such improvement, each node for a centroid in a tree 620 of the type illustrated in FIG. 6H contains additional information such as step count, direction, or even sound fingerprints.

Given a set of Paths, each represented by a tree 620 of centroids of the type illustrated in FIG. 6G, computer system 120 of some embodiments may start by clustering each tree level separately, like similarity clustering for stationary places of relevance, in some cases, with just some parameter tuning. As a result, the system of some embodiments may obtain three types of clusters: (A) Clusters of top level centroid (e.g. see FIG. 5D); (B) Clusters on the level of a smallest centroid (e.g. see FIGS. 5A and 5B); and (C) Clusters on intermediate level centroid (e.g. see FIG. 5C).

Several embodiments of a computer system 120, as illustrated by act 701 in FIG. 7, form clusters of top level centroids of tree 620. Clusters of top level centroid may mean that two Paths are within the same area of interest. In most cases, this area may be a specific building, supermarket, mall, etc in which a user of the mobile device stays within a certain range without being stationary (no standing or sitting). Several embodiments of system 120 initially build up a database of such paths. Essentially, once computer system 120 has detected a sufficient number of visits by a person to a place modeled by a certain top level centroid, the system may define it as an area of interest, based on recognition that a current path is same as a path previously observed (based on its presence in the database). In summary, after system 120 has detected a sufficient number of visits to a certain top level centroid, system 120 marks in memory 110 that this node is an area of relevance (as per act 702 in FIG. 7).

Several embodiments of processor 100, as illustrated by act 703 in FIG. 7, form clusters on the level of smallest centroids, which are represented by bottom level nodes of tree 620 (FIG. 6H). In certain embodiments, processor 100 determines that two paths pass through a single bottom level node representing a common small area (i.e. paths cross each other), with the size of the area being determined by minimum radius $d_{min}$ as a smallest scale on which a model is built.

If multiple paths within a building (identified by a top level centroid) have a match within one such smallest centroid (as per act 704 in FIG. 7), then processor 100 marks this centroid (as per act 705 in FIG. 7) as corresponding to an area that is commonly used by many users in the building, such as an entrance or a central point of a building (e.g. elevator).

When processor 100 finds that two or more paths match one another partially, in a sequence of consecutive smallest radius centroids (as per act 706 in FIG. 7), then processor 100 marks these paths as sharing a subpath (as per act 707 in FIG. 7). In one such example, one path is a hallway while another path is a passage from one office on the hallway to another office. Another example is a cafeteria, wherein paths that start at different locations and end at different tables at the cafeteria are marked by processor 100 for having a common subpath (as per act 707). Moreover, processor 100 determines that two or more paths are identical to one another if they completely match, on all smallest level centroids. In some embodiments, processor 100 is programmed to use a probabilistic model on centroids at the smallest level, to identify identical paths. Instead of using a hard threshold to determine if a measure is inside POR (smallest centroid), other embodiments use a Gaussian model to model the noise and drive the decision making based on the Gaussian model.

Several embodiments of processor 100, as illustrated by act 708 in FIG. 7, form clusters on intermediate level centroid. Such a match can occur for paths that have already been found to match on one of the levels described above, but in some situations paths only match within a single centroid on an intermediate level. Accordingly, in some embodiments, processor 100 is programmed to check if paths that match on the top level centroid also match on an intermediate level centroid (as per acts 708 and 709), and if so processor 100 marks in memory that there is a specific region in which two paths come particularly close (as per act 710). Note that processor 100 does not mark these paths as having a common subpath, and instead processor 100 marks in memory that that user tends to often pass through a certain constrained area identified by the intermediate level nodes.

In one illustrative example, processor 100 determines from additional information (e.g. user input) that a top level centroid corresponds to a supermarket. In this example, processor 100 uses this additional information in act 710 to mark such an intermediate level centroid as corresponding to a certain department that the user always visits without always walking the same path through it. In another such example, processor 100 marks the intermediate node (in act 710) as representing an area of the cafeteria where users select food items to purchase, and/or where users pay for the food items. Thus such intermediate centroids that are marked in act 710 of some embodiments are used by processor 100 to detect supermarket or cafeteria like places, and help identify places of relevance that are complex, like a user's "home".

On performing acts 708 and 709, if processor 100 finds that paths match on an intermediate level centroid without a match of any other level, then processor 100 marks the intermediate level node (as per act 711 in FIG. 7) as representing a common region between two areas of relevance. In one such example, the intermediate level node identified in act 711 is a parking lot between two shops in a shopping center.

For every level of a tree 620 (FIG. 6H), similarity clustering (e.g. see FIG. 5D) performed by processor 100 of some embodiments generates a list of centroids. These centroids are used for matching in a recognition module (e.g. see FIG. 5E) of processor 100 of such embodiments. Accordingly, some embodiments of processor 100 implement a discovery system 130 (FIG. 4A) for a place of relevance (POR) based on a user's visits to adjacent or nearby places in the same or different visit and recording corresponding PORs to be the same semantic place with a common label (e.g. a label previously used for a stationary POR).

Figure 8A:
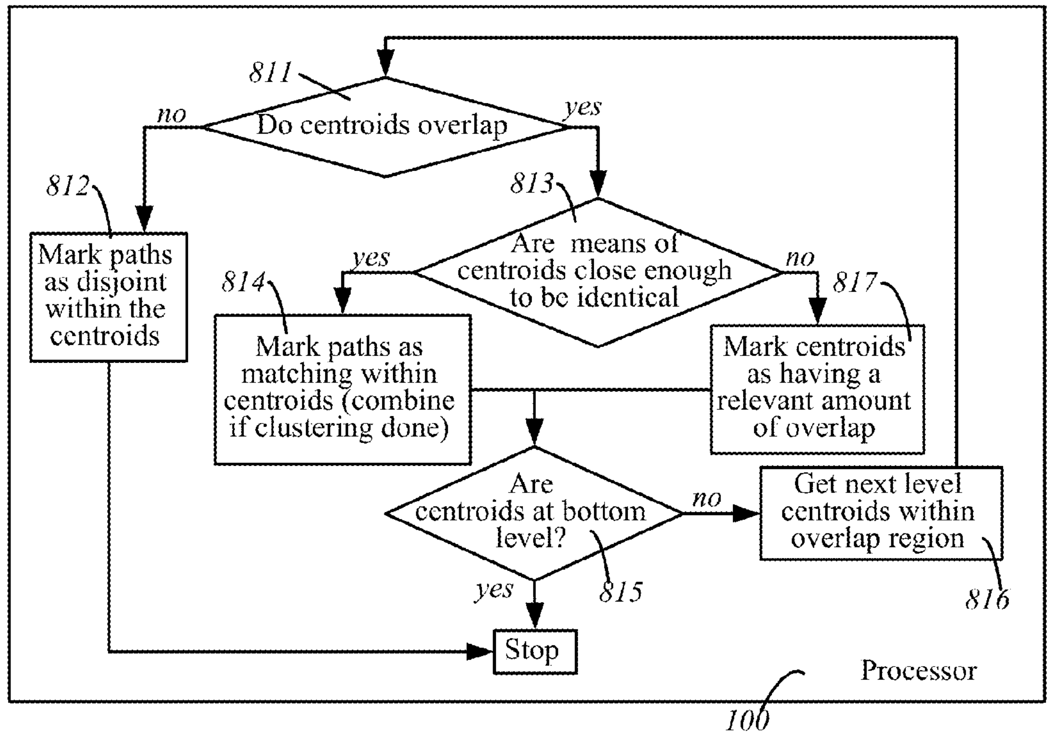
FIG. 8A illustrates in a high-level flow chart, additional acts performed by a processor 100 of mobile device 120 of FIG. 5A, to compare subsets of measurements of a path to another path.
Figure 8B:
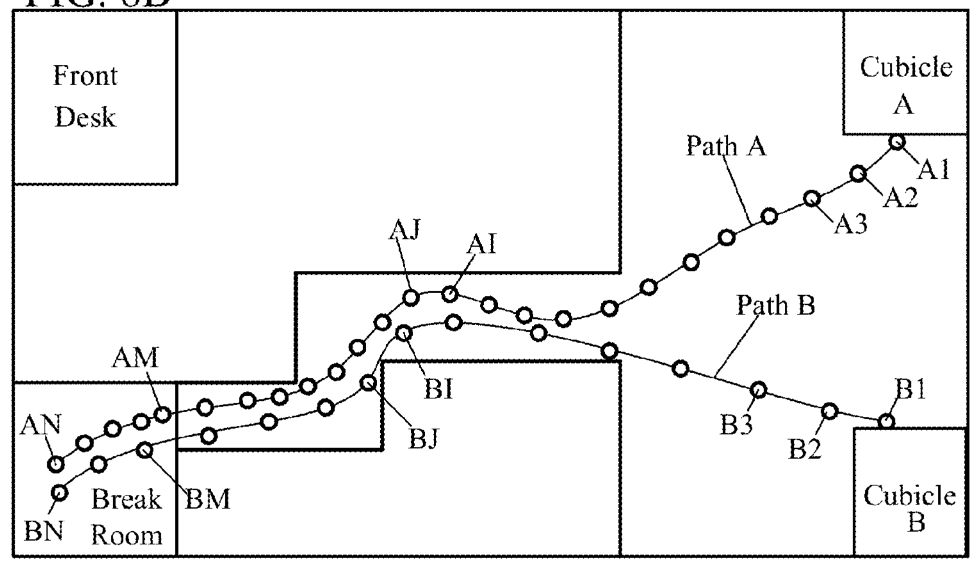
FIG. 8B illustrates measurements along two paths "A" and "B" through an office 600, starting from two cubicles and both ending in a break room.

Several embodiments of processor 100 match trees of the type described above for two paths A and B shown in FIG. 8B, by performing one or more acts illustrated in FIG. 8A.

Figure 8C:
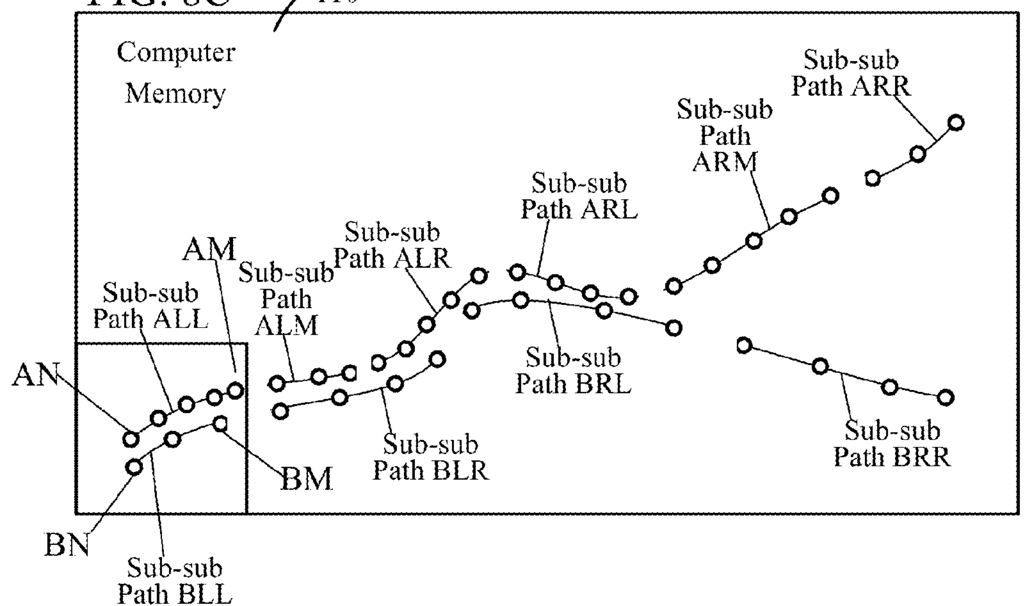
FIG. 8C illustrates, in memory 110 of mobile device 120 of FIG. 5A, the measurements along the two paths of FIG. 8B subdivided into multiple subsets that are then compared.

Processor 100 of some embodiments is programmed to recursively compare subsets of measurements (shown in FIG. 8C) on the two paths A and B by traversing their trees (shown in FIG. 8D), with comparison being done on a level by level, centroid by centroid basis. First, processor 100 starts by checking if top level (also called "root node") centroids $C_1^A$ and $C_1^B$ of the paths A and B are on the same level (e.g. contained within the same size centroid, such as for an office building). If one path is large and the other one smaller, then processor 100 may have required a much larger centroid to fit in. Should one path (say path A) correspond to a larger centroid, processor 100 simply collects all the centroids of path A that are on the same level as the top level centroid of path B and repeats the procedure described below for each of them.

In a first step of path matching, processor 100 checks if the two centroids have an overlap as per act 811. There are three possibilities: (a) The centroids do not overlap. In this case processor 100 marks the two paths as being disjoint within these centroids, as per act 812. (b) In act 811 if the answer is yes, processor 100 goes to act 813 to check if the means (averages) of centroids are close enough to each other (e.g. within a predetermined threshold) for them to be considered identical. In this case (b), if processor 100 finds the answer in act 813 is yes, i.e. the path matches within these centroids on the corresponding level, and the centroids are marked as matching as per act 814. In this case (b) if clustering is done the centroids may be combined by processor 100, and a counter for the number of times that a certain path was visited may be increased. In act 813 if the answer is no, processor 100 determines that (c) the centroids have a relevant amount of overlap. In some embodiments, processor 100 determines "relevant overlap" as an overlap on the order of magnitude of the smallest centroid as defined by $d_{min}$ and this observation is marked by processor 100 in some embodiments by performing act 817.

In another step of path matching, processor 100 checks if the current centroids were at the level of smallest centroids, as per act 815 and if so then stop. Act 815 is reached from acts 814 and 817 as shown in FIG. 8A. Same is true in possibility (a) described above for path matching procedure (the no overlap possibility), wherein after act 812, processor 100 stops. Otherwise, if the answer in act 815 is no, then in cases (b) and (c) of the above path matching procedure (go to step 1, act 811) is repeated for each pair (one from each path) of next level centroids within the overlap region as per act 816. In some embodiments, a breadth first search is performed in path matching by processor 100.

Figure 8D:
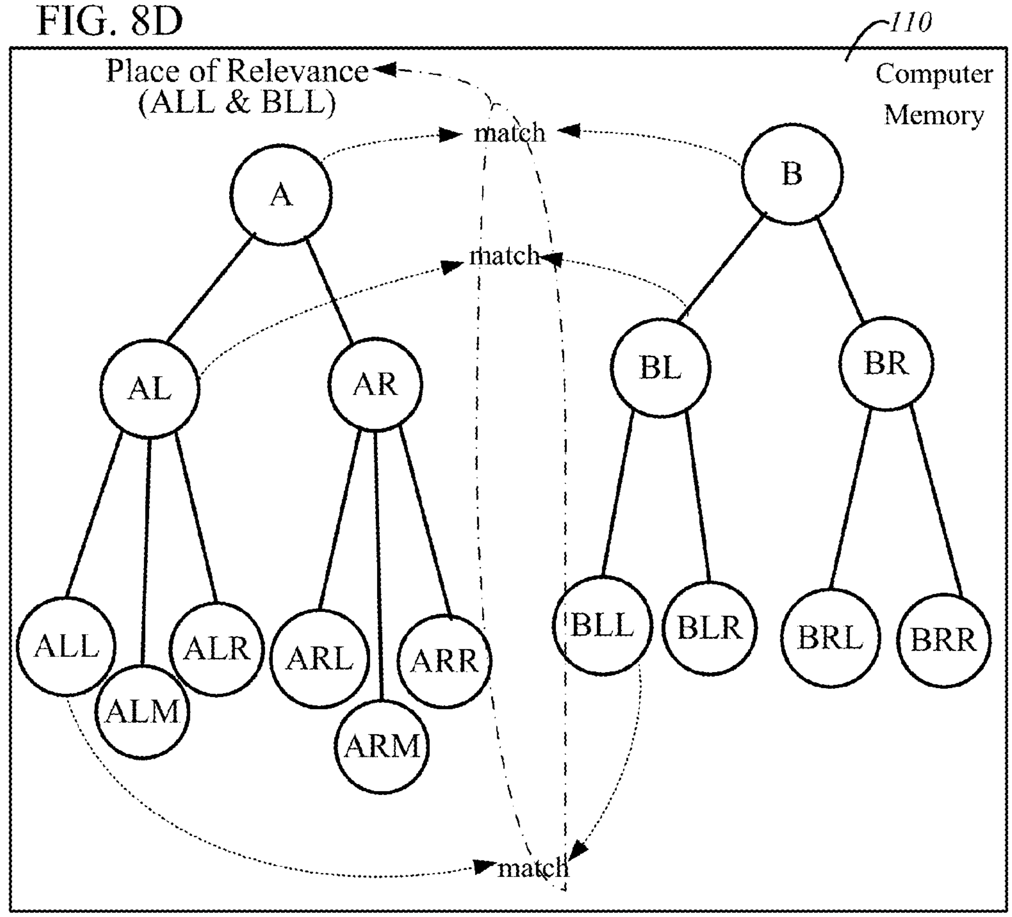
FIG. 8D illustrates matching of subsets of measurements on the two paths of FIG. 8B.

When the above-described path matching procedure terminates, the result is a list of centroids for which the paths were found to be matching as illustrated in FIG. 8D. Note that centroids in the list can be on different levels (it means that they correspond to centroids with different radius). Thus, for example, one centroid on the list may correspond to an office building 201 (FIG. 1B) as a whole while another (included in the larger one) may be area 203 of this same office building 201. The fact that two Paths A and B (FIG. 8D) match within a centroid on a given level (say root node level or the 1st level below the root node level) does not mean that they match within any of the centroids on the following levels (e.g. the bottom level shown in FIG. 6H). For example, there may be a bunch of paths that are all within the same office building, but each in a different area of the building. However, when a pair of centroids that match at the lowest level (e.g. centroids ALL and BLL in FIG. 8D), they are used to mark in memory 110, a path-based place of relevance (POR).

Some embodiments determine the size of a place of relevance (POR) adaptively over time, based on distribution of place revisits. For example, during multiple revisits to a small place, such as a person's office inside a building, the person usually spends most of their time in the same location within that place (e.g. the person usually sits in the same chair, at their desk). Accordingly, several embodiments use similarity (e.g., execute a Tanimoto function), in signal measurements across multiple place revisits, being sufficiently high (e.g. variance being below a predetermined threshold) to determine the size of a place of relevance to be progressively smaller (over the multiple place revisits), i.e. to shrink the size of the POR by use of pair-wise distances indicative of dissimilarity, e.g. as described below in reference to FIGS. 9A-9D.

Similarly, during multiple revisits to a large place, such as a cafeteria in a building, a person usually spends their time in different locations within that large place (e.g. the person may sit at different tables on different days). Accordingly, several embodiments use signal measurements across multiple place revisits being distant, but still within the same place of relevance, to enlarge the size of the POR, to make it progressively larger (over the multiple place revisits) until a predetermined maximum size is reached, e.g. as described below in reference to FIGS. 9E and 9F.

Figure 9A:
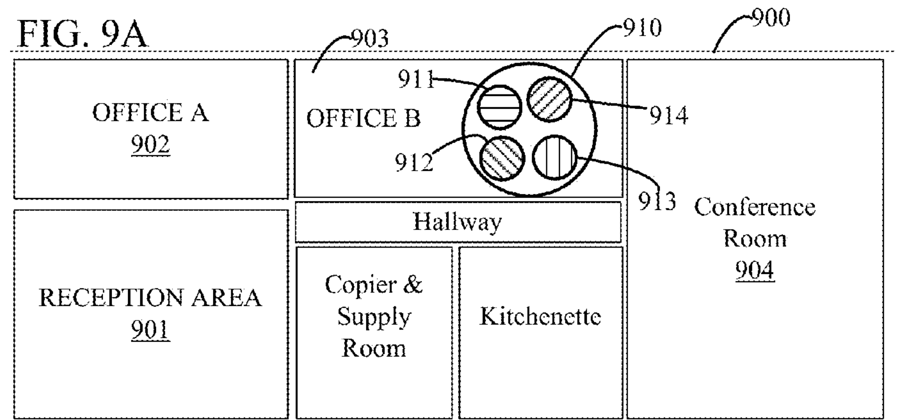
FIG. 9A illustrates on an indoor map, an example of automatically sizing a place of relevance (POR) according to one or more illustrative aspects of some embodiments in the disclosure.
Figure 9B:
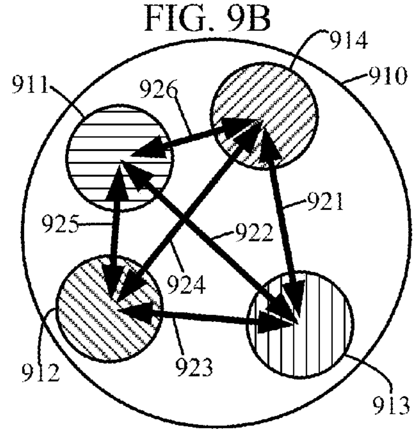
FIG. 9B illustrates, in the extended POR 910 of FIG. 9A, between visits 911-914 (shown as circles with hatching), the pair-wise distances indicative of dissimilarity between measurements (shown as bi-directional arrows 921-926) that are used to automatically size the extended POR 910 in one or more illustrative aspects of some embodiments in the disclosure.

FIG. 9A illustrates an office suite 900 within a building, including a reception area 901, two offices 902 and 903, a conference room 904. FIG. 9A also illustrates, within office 903, an extended place of relevance 910 that has been formed by combining four places of relevance 911-914, e.g. by performing act 105 described above in reference to FIG. 1A. In forming the place of relevance 910 (FIG. 9B), computer system 120 computes pair-wise distances 921-926 (FIG. 9B) between the centroids of the four places 911, 912, 913, and 914 (e.g. obtained by executing the Tanimoto function). Then, computer system 120 computes the mean $\mu$ the standard deviation $\sigma$ of the pair-wise distances 921, 922, 923, 924, 925 and 926, e.g. illustrated in FIG. 9C, followed by computing the size of the extended POR 910 as follows: $d_{size}=\mu+3\sigma$.

Figure 9D:
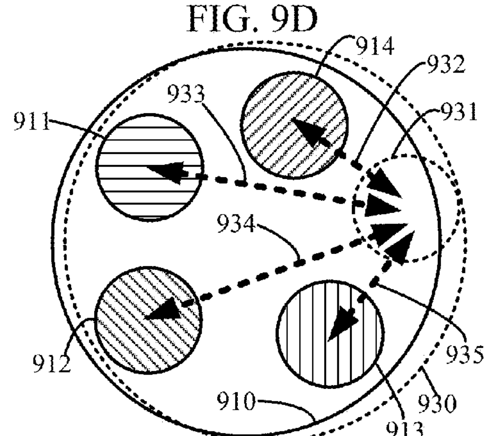
FIG. 9D illustrates the addition of a new visit 931 to the visits 911-914 of extended POR 910, to obtain a new extended POR 930 in one or more illustrative aspects of some embodiments in the disclosure.
Figure 9C:
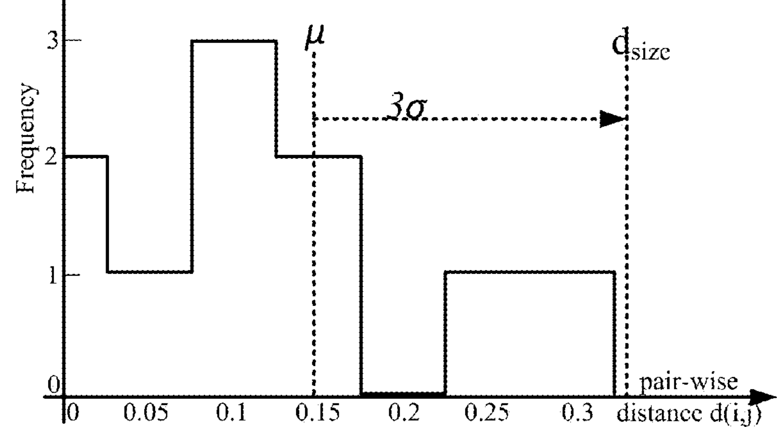
FIG. 9C illustrates, in a graph, frequency of occurrences (along the y-axis) of the pair-wise distances (along the x-axis) between visits in an extended POR for use in sizing, as $d_{size}=\mu+a\sigma$ (for example, a=3, although a can be any constant value such as 2, 2.99, 4 etc, depending on the embodiment).

At this state, if a new place of relevance 931 is found to be sufficiently close to extended POR 910, then extended POR 910 may be changed to a new extended POR 930 as illustrated in FIG. 9D, by computer system 120 computing additional pair-wise distances 932, 933, 934 and 935 and using them to compute a new mean $\mu_n$ and a new standard deviation $\sigma_n$ of the pair-wise distances 921-926 and 932-935, followed by computing the size of the extended POR 930 as follows: $d_{nsize}=\mu_n+3\sigma_n$.

When a new place visit CVt has been determined, computer system 120 of some embodiments performs a method of the type illustrated in FIG. 9E, as follows. Specifically, in act 941, computer system 120 uses place visit $CV_t$ to find from among known place models 135 (FIG. 4A), a place of relevance $POR_t$ that is closest to place visit $CV_t$ and then goes to act 942. In act 942, computer system 120 checks whether the distance between the two places $CV_t$ and $POR_t$ (denoted as dist $(CV_t, POR_t)$) is less than the current size $d_{size}$ of the place of relevance $POR_t$.

When the answer in act 942 is no, then computer system 120 performs act 943 to create a new place of relevance $POR_{new}$ and sets its size $d_{newsize}$ to be a predetermined distance, e.g. $d_{defaultSize}$. When the answer in act 942 is yes, then computer system 120 updates the existing place of relevance $POR_t$ by including the place $CV_t$ therein in act 944 and then goes to act 945. In act 945, computer system 120 re-computes the size of the existing place of relevance $POR_t$ to be $Rd_{size}$ although a specific manner in which act 945 is implemented is different depending on the embodiment, as discussed below. On completion of act 945, if the $Rd_{size}$ is less than or equal to a predetermined minimum $d_{minSize}$ (see act 946), then the current size $d_{size}$ is changed to the minimum $d_{minSize}$ (see act 947). And if the $Rd_{size}$ is greater than or equal to a predetermined maximum $d_{maxSize}$ (see act 948), then the current size $d_{size}$ is changed to the minimum $d_{maxSize}$ (see act 949). Finally, when the answer to both acts 946 and 948 is no, then in an act 950 the current size $d_{size}$ is changed to the $Rd_{size}$.

In a first example described above in reference to FIGS. 9A-9D, act 945 of FIG. 9E computes $Rd_{size}$ as described above, specifically $Rd_{size}=\mu+3\sigma$. In a second example, the existing place of relevance $POR_t$ is to be enlarged in act 945 as described herein, and some embodiments use a similar formula with a predetermined factor $k\geq 1$ to scale up, so that $Rd_{size}=k\cdot(\mu+3\sigma)$. Note, however that the $\mu$ and $\sigma$ are of distances between visits and the existing place of relevance $POR_t$ (and not the pair-wise distances used to compute $\mu$ and $\sigma$ in the first example described above). In a third example, the $Rd_{size}=d_{size}+\alpha*(dist(CV_t, POR_t)-d_{size}/2)$, wherein $0\leq\alpha\leq 1$ and $\alpha$ is a predetermined constant. Note that dist=1—similarity, wherein similarity is obtained by execution of a similarity function, such as Tanimoto.

An extended POR 960 (FIG. 9F) is shrunk in an act 952 in some embodiments (e.g. using any formula described above), when a new place 961 to be included in the POR 960 is found in act 951 (FIG. 9E) to be at a sufficiently small distance ($dist(CV_1, POR_t)$, e.g. less than half of the radius of POR 960, or $d_{size}/2$. The same extended POR 960 (FIG. 9F) is enlarged in an act 954 in some embodiments (e.g. using any formula described above), when another new place 962 to be included in the POR 960 is found in act 953 to be at a sufficiently large distance ($dist(CV_2, POR_t)$, e.g. more than half of the radius of POR 960, or $d_{size}/2$ but less than the radius $d_{size}$ of POR 960.

Accordingly, methods, apparatuses, systems, and non-transitory computer-readable media for discovering and/or automatically sizing places of relevance (PORs) are presented in this detailed description. In some aspects, in discovering one or more places of relevance, a set of measurements of wireless signals may be received or otherwise obtained by a mobile device or by a server or by a combination thereof as illustrated by act 971 in FIG. 9G. Then, one or more places may be identified (by hardware or by processor(s) executing software, or other means) as illustrated by act 972 in FIG. 9G.

Each place that is identified may have a centroid, obtained by using one or more measurements in a subset among the set of measurements. In some aspects, identification of a place may be based on measurements that are made sequentially in time as per 972A (FIG. 9G). Such identification may be based on similarity of the measurements, by hardware or by processor(s) executing software, or other means answering the question "Am I in the same place?" and if so returning to 972 to include the measurement in computing a centroid of a place currently being identified.

In certain aspects, two such places are used in act 972A to determine whether these places occur sequentially along a path (e.g. if their measurements are sequential in time), and to determine whether they have centroids that are sufficiently similar to one another (e.g. Tanimoto distance less than 0.1) and when both conditions are satisfied act 973 (FIG. 9G) is performed. In several aspects, two places are identified in act 972B independent of any time at which the measurements are made, based on comparison of labels that are determined to be similar or identical, and based on centroids that are determined to be sufficiently similar to one another and when both conditions are satisfied act 973 (described below) is again performed.

In act 973, it may be determined (by hardware or by processor(s) executing software, or other means), based on comparing two centroids, whether corresponding two places that have the two centroids, are similar. Then, in act 974, a place of relevance may be stored, e.g. as a list that includes the corresponding two places that were used in act 973, based on the corresponding two places being determined to be similar (by hardware or by processor(s) executing software, or other means).

In some aspects, user input specifying one or more labels to be associated with one or more places of relevance of the plurality of places of relevance may be received (by hardware or by processor(s) executing software, or other means). Subsequently, it may be determined (by hardware or by processor(s) executing software, or other means), based on the received user input, whether at least two places of relevance of the plurality of places of relevance are associated with a common label in the one or more labels or with labels that are determined to be similar. Additionally, as noted above it may be determined (by hardware or by processor(s) executing software, or other means), based on one or more distance metrics (indicative of dissimilarity), whether the at least two places of relevance are similar. Thereafter, in response to determining that the at least two places of relevance are associated with similar labels (or the same label), and in response to determining that the at least two places are similar, it may be determined (by hardware or by processor(s) executing software, or other means) that the at least two places define an extended place of relevance.

In certain aspects, measurements may be included in each subset for being measured sequentially in time relative to one another, and identification of each place may be based on such subsets. Each measurement may be included in a subset of measurements based on, for example, checking (by hardware or by processor(s) executing software, or other means) whether a test on a measure of similarity is satisfied by the measurement (e.g. relative to a centroid of the subset). The measure of similarity may be obtained, for example, by hardware or by processor(s) executing software, or other means executing a similarity function to compare each measurement with a centroid of measurements in the subset. Each measurement may include a group of identifiers of transmitters of wireless signals and strengths of the wireless signals received from the transmitters identified in the group. Each centroid may include a group of averages corresponding to wireless transmitters identified in the specific group. Each average may be computed (by hardware or by processor(s) executing software, or other means) for each wireless transmitter identified in the specific group, across the strengths of a corresponding wireless signal from the each wireless transmitter measured in making the measurements.

In several aspects, a root node of a tree may be created (by hardware or by processor(s) executing software, or other means) based on a set of measurements and multiple child nodes in the tree may be connected to the root node, wherein at least one child node is created based on a subset of measurements in the set. As noted above, measurements may be included in each subset for being measured sequentially in time relative to one another, and for satisfying a test on a measure of similarity. Multiple subsets in the set of measurements may be compared (by hardware or by processor(s) executing software, or other means), with subsets of additional measurements, to identify a new place of relevance. Additionally or alternatively, multiple subsets in the set of measurements may be compared (by hardware or by processor(s) executing software, or other means) with subsets in another set of measurements, to identify a known place of relevance.

Computer system 120 of some embodiments is a mobile device, such as a smartphone that includes a camera 1019 (FIG. 4A) to generate frames of a video of a real world object that is being displayed on a screen. As noted above, computer system 120 may further include various sensors 1003 that provide measurements indicative of actual movement, such as an accelerometer, a gyroscope, a compass, or the like. Computer system 120 may use an accelerometer and a compass and/or other sensors to sense tilting and/or turning in the normal manner, to assist processor 100 in determining its own orientation and position relative to ground. Instead of or in addition to sensors 1003, computer system 120 may use images from a camera 1019 to assist processor 100 in determining its own orientation and position. Also, computer system 120 may additionally include a graphics engine 1004 and an image processor 1005 that are used in the normal manner. Computer system 120 may optionally include various modules to support Augmented Reality (AR) functionality.

In addition to memory 110, computer system 120 may include one or more other types of memory such as flash memory (or SD card) and/or a hard disk and/or an optical disk (also called "secondary memory") 1008 to store data and/or software for loading into memory 110 (also called "main memory") and/or for use by processor(s) 100. Computer system 120 may further include a wireless transmitter and receiver in transceiver 1010 and/or any other communication interfaces. It should be understood that computer system 120 may be any portable electronic device such as a cellular or other wireless communication device, personal communication system (PCS) device, personal navigation device (PND), Personal Information Manager (PIM), Personal Digital Assistant (PDA), laptop, camera, smartphone, tablet (such as iPad available from Apple Inc) or other suitable mobile platform that is capable of creating an augmented reality (AR) environment.

A computer system 120 of the type described above may include other position determination methods such as object recognition using "computer vision" techniques. The computer system 120 may further include, in a user interface, a microphone and a speaker. Of course, computer system 120 may include other elements unrelated to the present disclosure, such as a read-only-memory 1007 which may be used to store firmware for use by processor 100.

In some embodiments of computer system 120, the above-described modules are implemented by one or more processor (s) 100 executing instructions of software in memory 110 of computer system 120 although in other embodiments any one or more modules are implemented in any combination of hardware circuitry and/or firmware and/or software in computer system 120. Hence, depending on the embodiment, various functions of the type described herein may be implemented in software (executed by one or more processing units or processor cores) or in dedicated hardware circuitry or in firmware, or in any combination thereof.

Processor(s) 100 perform functions implemented by one or more processing units in computer system 120. For a hardware implementation, one or more processing units of processor(s) 100 may be implemented within one or more microprocessors, embedded processors, controllers, application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, or a combination thereof. For a firmware and/or software implementation, the methodologies may be implemented with modules (e.g., procedures, functions, and so on) that perform the functions described herein.

Moreover, as used herein the term "memory" refers to any type of computer storage medium that is non-transitory, including long term, short term, or other memory associated with the mobile platform, and is not to be limited to any particular type of memory or number of memories, or type of media upon which memory is stored. Hence, methodologies described herein may be implemented by various means depending upon the application. For example, these methodologies may be implemented in firmware (FIG. 4A) or software, or hardware or any combination thereof.

Any machine-readable medium tangibly embodying computer instructions may be used in implementing the methodologies described herein. For example, software (FIG. 4A) may include program codes stored in memory 110 and executed by processor 100. Memory may be implemented within or external to the processor 100. If implemented in firmware and/or software, the functions may be stored as one or more computer instructions or code on a computer-readable medium. Examples include non-transitory computer-readable media encoded with a data structure (such as a sequence of predetermined movements) and non-transitory computer-readable media encoded with a computer program (such as software that can be executed to perform a method described above).

Several illustrative embodiments are described with respect to the accompanying drawings, which form a part hereof. While particular embodiments, in which one or more aspects of the disclosure may be implemented, are described, other embodiments may be used and various modifications may be made without departing from the scope of the disclosure or the spirit of the appended claims.

Although the present disclosure is illustrated in connection with specific embodiments, the embodiments are not limited thereto. Hence, although item 120 in some embodiments is a mobile device, in other embodiments item 120 is implemented by use of form factors that are different, e.g. in certain other embodiments item 120 is a mobile platform (such as a tablet, e.g. iPad available from Apple, Inc.) while in still other embodiments item 120 is any electronic device or computer system. Illustrative embodiments of such an electronic device or system 120 may include multiple physical parts that intercommunicate wirelessly, such as a processor and a memory that are portions of a stationary computer, such as a lap-top computer, a desk-top computer, or a server computer communicating over one or more wireless link(s) with sensors and user input circuitry enclosed in a housing that is small enough to be held in a hand.

FIG. 4A illustrates an example computing system in which one or more aspects of the disclosure may be implemented. For instance, a computer system as illustrated in FIG. 4A may be incorporated as part of a computing device, which may implement, perform, and/or execute any and/or all of the features, methods, and/or method steps described herein. For example, computer system 120 may represent some of the components of a hand-held device. A hand-held device may be any computing device with an input sensory unit, such as a camera and/or a display unit. Examples of a hand-held device include but are not limited to video game consoles, tablets, smart phones, and mobile devices.

FIG. 4A provides a schematic illustration of one embodiment of a computer system 120 that can perform the methods provided by various other embodiments, as described herein, and/or can function as the host computer system, a remote kiosk/terminal, a point-of-sale device, a mobile device, a set-top box, and/or a computer system. FIG. 4A is meant only to provide a generalized illustration of various components, any and/or all of which may be utilized as appropriate. FIG. 4A, therefore, broadly illustrates how individual system elements may be implemented in a relatively separated or relatively more integrated manner.

The computer system 120 is shown comprising hardware elements that can be electrically coupled via a bus 1015 (or may otherwise be in communication, as appropriate). The hardware elements may include one or more processors 100, including without limitation one or more general-purpose processors and/or one or more special-purpose processors (such as digital signal processing chips, graphics acceleration processors, and/or the like); one or more input devices 115, which can include without limitation a camera, a mouse, a keyboard and/or the like; and one or more output devices 121, which can include a display unit, a printer and/or the like.

The computer system 120 may further include (and/or be in communication with) one or more non-transitory storage devices 125, which can comprise, without limitation, local and/or network accessible storage, and/or can include, without limitation, a disk drive, a drive array, an optical storage device, a solid-state storage device such as a random access memory ("RAM") and/or a read-only memory ("ROM"), which can be programmable, flash-updateable and/or the like. Such storage devices may be configured to implement any appropriate data storage, including without limitation, various file systems, database structures, and/or the like.

The computer system 120 might also include a communications subsystem 122, which can include without limitation a modem, a network card (wireless or wired), an infrared communication device, a wireless communication device and/or chipset (such as a Bluetooth® device, an 802.11 device, a WiFi device, a WiMax device, cellular communication facilities, etc.), and/or the like. The communications subsystem 122 may permit data to be exchanged with a network (such as the network described below, to name one example), other computer systems, and/or any other devices described herein. Computer system 120 may further comprise a non-transitory memory 110, which can include a RAM or ROM device, as described above.

The computer system 120 also can comprise software elements, shown as being currently located within the memory 110, including an operating system 140, device drivers, executable libraries, and/or other code, such as one or more application programs 145, which may comprise computer programs provided by various embodiments, and/or may be designed to implement methods, and/or configure systems, provided by other embodiments, as described herein. Merely by way of example, one or more procedures described with respect to the method(s) discussed above might be implemented as code and/or instructions executable by a computer (and/or a processor within a computer); in an aspect, then, such code and/or instructions can be used to configure and/or adapt a general purpose computer (or other device) to perform one or more operations in accordance with the described methods.

A set of these instructions and/or code might be stored on a computer-readable storage medium, such as the storage device(s) 125 described above. In some cases, the storage medium might be incorporated within a computer system, such as computer system 120. In other embodiments, the storage medium might be separate from a computer system (e.g., a removable medium, such as a compact disc), and/or provided in an installation package, such that the storage medium can be used to program, configure and/or adapt a general purpose computer with the instructions/code stored thereon. These instructions might take the form of executable code, which is executable by the computer system 120 and/or might take the form of source and/or installable code, which, upon compilation and/or installation on the computer system 120 (e.g., using any of a variety of generally available compilers, installation programs, compression/decompression utilities, etc.) then takes the form of executable code.

Substantial variations may be made in accordance with specific requirements. For example, customized hardware might also be used, and/or particular elements might be implemented in hardware, software (including portable software, such as applets, etc.), or both. Further, connection to other computing devices such as network input/output devices may be employed.

Some embodiments may employ a computer system (such as the computer system 120) to perform methods in accordance with the disclosure. For example, some or all of the procedures of the described methods may be performed by the computer system 120 in response to processor 100 executing one or more sequences of one or more instructions (which might be incorporated into the operating system 140 and/or other code, such as an application program 145) contained in memory 110. Such instructions may be read into memory 110 from another computer-readable medium, such as one or more of the storage device(s) 125. Merely by way of example, execution of the sequences of instructions contained in the working memory 110 might cause the processor(s) 100 to perform one or more procedures of the methods described herein.

An application program 145 of some embodiments may use recognition of a POR by recognition system 150 to display information to the user, which information is selected based on the POR that has been recognized. The information displayed depends on the embodiment, for example when a user is walking by a restaurant, an advertisement or a coupon may be displayed on an output device 121, such as a screen of computer system 120 (which may be a mobile device).

Computer system 120 of some embodiments constructs user profiles based on place visit information from recognition system 150, and then uses the user profiles to answer several questions. As a first example, how many times is a place visited and how much time is spent in average over the course of a week (e.g., HOME, WORK)? As a second example, when is my last visit to unremembered places? (e.g., TIRE EXCHANGE). In addition some embodiments of computer system 120 extract a user's behavior pattern and store it in a user profile (e.g., which type of place did I go to frequently, GYM or SHOP?, when did I go to GROCERY mostly?). Such a user's offline profile is thereafter used by application program 145 of some embodiments to obtain a deeper understanding of user's behavior and to decide on suitable marketing targets and strategies.

Computer system 120 of some embodiments uses such user profiles to predict user behavior. Based on temporal pattern of place visits, application program 145 of some embodiments predicts a user's next visit, and uses this prediction to perform various actions. For example, when discovery system 130 identifies that one pattern is that the user goes to a restaurant after visiting a movie theater, application program 145 uses this pattern to obtain and display coupons for restaurants which are in the area and that may be attractive to the user. Such prediction-based advertisement by computer system 120 reaches the user immediately before an actual purchase happens, and influences the user's behavior, e.g. guiding the user to a different restaurant.

The terms "machine-readable medium" and "computer-readable medium," as used herein, refer to any non-transitory medium that participates in providing data that causes a machine to operate in a specific fashion. In an embodiment implemented using the computer system 120, various computer-readable media might be involved in providing instructions/code to processor(s) 100 for execution and/or might be used to store and/or carry such instructions/code (e.g., as signals). In many implementations, a computer-readable medium is a physical and/or tangible storage medium. Such a non-transitory medium may take many forms, including but not limited to, non-volatile media, and volatile media. Non-volatile media include, for example, optical and/or magnetic disks, such as the storage device(s) 125. Volatile media include, without limitation, dynamic memory, such as memory 110.

Non-transitory computer-readable media includes physical and/or tangible computer-readable storage media. A storage medium may be any available non-transitory medium that can be accessed by a computer. By way of example, and not limitation, such computer-readable media can comprise punchcards, papertape, RAM, ROM, PROM, EPROM, EEPROM, Flash Memory, CD-ROM or other optical disk storage, magnetic disk storage or other magnetic storage devices, or any other non-transitory medium that can be used to store program code in the form of software instructions (also called "processor instructions" or "computer instructions") or data structures and that can be accessed by a computer; disk and disc, as used herein, includes flexible disk, hard disk, compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

Various forms of non-transitory computer-readable media may be involved in carrying one or more sequences of one or more instructions to the processor(s) 100 for execution. Merely by way of example, the instructions may initially be carried on a magnetic disk and/or optical disc of a remote computer. A remote computer might load the instructions into its dynamic memory and send the instructions as signals over a transmission medium to be received and/or executed by the computer system 120. These signals, which might be in the form of electromagnetic signals, acoustic signals, optical signals and/or the like, are all examples of carrier waves on which instructions can be encoded, in accordance with some embodiments of the type described herein.

The communications subsystem 122 (and/or components thereof) generally will receive the signals, and the bus 105 then might carry the signals (and/or the data, instructions, etc. carried by the signals) to memory 110, from which the processor(s) 100 retrieves and executes the instructions. The instructions received by the memory 110 may optionally be stored on a non-transitory storage device 125 either before or after execution by the processor(s) 100.

The methods, systems, and devices discussed above are examples. Various embodiments may omit, substitute, or add various procedures or components as appropriate. For instance, in alternative configurations, the methods described may be performed in an order different from that described, and/or various stages may be added, omitted, and/or combined. Also, features described with respect to certain embodiments may be combined in various other embodiments. Different aspects and elements of the embodiments may be combined in a similar manner. Also, technology evolves and, thus, many of the elements are examples that do not limit the scope of the disclosure to those specific examples.

Specific details are given in the description to provide a thorough understanding of the embodiments. However, embodiments may be practiced without these specific details. For example, well-known circuits, processes, algorithms, structures, and techniques have been shown without unnecessary detail in order to avoid obscuring the embodiments. This description provides example embodiments only, and is not intended to limit the scope, applicability, or configuration of embodiments of the type described herein. Rather, the preceding description of the embodiments will provide those skilled in the art with an enabling description for implementing embodiments. Various changes may be made in the function and arrangement of elements without departing from the spirit and scope of the disclosure.

Also, some embodiments were described as processes depicted as flow diagrams or block diagrams. Although each may describe the operations as a sequential process, many of the operations can be performed in parallel or concurrently. In addition, the order of the operations may be rearranged. A process may have additional steps not included in the figure. Furthermore, embodiments of the methods may be implemented by hardware, software, firmware, middleware, microcode, hardware description languages, or any combination thereof. When implemented in software, firmware, middleware, or microcode, the program code or code segments to perform the associated tasks may be stored in a computer-readable medium such as a storage medium. Processors may perform the associated tasks.

Having described several embodiments, various modifications, alternative constructions, and equivalents may be used without departing from the spirit of the disclosure. For example, the above elements may merely be a component of a larger system, wherein other rules may take precedence over or otherwise modify the application of embodiments of the type described herein. Also, a number of steps may be undertaken before, during, or after the above elements are considered. Accordingly, the above description does not limit the scope of the embodiments.

Various adaptations and modifications may be made without departing from the scope of the disclosure. Therefore, the spirit and scope of the appended claims should not be limited to the foregoing description. It is to be understood that several other aspects of the embodiments will become readily apparent to those skilled in the art from the description herein, wherein it is shown and described various aspects by way of illustration. The drawings and detailed description are to be regarded as illustrative in nature and not as restrictive.

What is claimed is:

1. A method of discovering places of relevance, comprising:

receiving, by a computing device, a set of measurements of wireless signals;

identifying, by the computing device, one or more places, each place having a signal measurements centroid and a size of spatial expansion, the signal measurements centroid being computed using at least a subset of measurements from multiple transmitters in the set of measurements of wireless signals;

wherein the signal measurements centroid comprises a vector of values of signal strengths, each value in the vector being computed based on a plurality of strengths of a corresponding wireless signal of a transmitter;

wherein the signal measurements centroid is based on measurements in the subset of each place being measured sequentially in time relative to one another along a real world path that starts in, ends in or passes through the each place;

determining, by the computing device, based at least on comparing two vectors of values of signal strengths of two signal measurements centroids to one another, whether corresponding two places that have the two signal measurements centroids, are similar; and storing in non-transitory memory, by the computing device, a new place based on the corresponding two places being determined to be similar at least by comparison of the two vectors of values of signal strengths, the new place having a new signal measurements centroid and a new size of spatial expansion;

wherein the comparing comprises at least executing a similarity function to compare the two vectors.

2. The method of claim 1 wherein:

the identifying is performed independent of a time at which each measurement is made.

3. The method of claim 2 further comprising:

receiving user input on one or more labels to identify the one or more places respectively; and comparing, by the computing device, two labels that identify the corresponding two places, to check whether the two labels are similar;

wherein the storing is performed further based on the two labels being determined to be similar.

4. The method of claim 3 wherein:

the one or more labels are obtained from at least two different users.

5. The method of claim 4 wherein:

a first set of the one or more labels is designated as public; and a second set of the one or more labels is designated as private to at least one user of the at least two different users.

6. The method of claim 1 wherein the identifying of the one or more places is based on:

comparing to a similarity threshold, a value of a measure of similarity of each measurement in the subset.

7. The method of claim 1 wherein:

the each measurement comprises a group of identifiers of a corresponding group of transmitters, and strengths of wireless signals therefrom; and each value in each vector in each centroid is an average of the plurality of strengths.

8. The method of claim 1 further comprising:

creating a root node of a tree based on the set of measurements of wireless signals and multiple child nodes in the tree connected to the root node, wherein at least one child node is created based on the subset.

9. The method of claim 8 further comprising:

comparing multiple subsets in the set of measurements of wireless signals, with subsets of additional measurements, to identify the new place.

10. The method of claim 1 further comprising:

comparing multiple subsets in the set of measurements of wireless signals, with subsets in another set of measurements, to identify a known place of relevance.

11. The method of claim 1 wherein:

the determining is performed independent of geographic information.

12. A device for processing measurements, the device comprising:

a wireless transceiver;

one or more processors coupled to the wireless transceiver;

non-transitory memory coupled to the one or more processors; and software held in the non-transitory memory that when run in the one or more processors, causes the one or more processors to:

receive a set of measurements of wireless signals;

identify one or more places, each place having a signal measurements centroid and a size of spatial expansion, the signal measurements centroid being computed by using at least a subset of measurements from multiple transmitters in the set of measurements of wireless signals;

wherein the signal measurements centroid comprises a vector of values of signal strengths, each value in the vector being computed based on a plurality of strengths of a corresponding wireless signal of a transmitter;

wherein the signal measurements centroid is based on measurements in the subset of each place being measured sequentially in time relative to one another along a real world path that starts in, ends in or passes through the each place;

determine, based at least on comparison of two vectors of values of signal strengths of two signal measurements centroids to one another, whether corresponding two places that have the two signal measurements centroids, are similar; and store in the non-transitory memory, a new place based on the corresponding two places being determined to be similar at least by comparison of the two vectors of values of signal strengths, the new place having a new signal measurements centroid and a new size of spatial expansion;

wherein the comparison comprises at least executing a similarity function to compare the two vectors.

13. The device of claim 12 wherein:

identification of the one or more places is independent of a time at which each measurement is made.

14. The device of claim 13 wherein the software further causes the one or more processors to:

receive user input on one or more labels to identify the one or more places respectively; and compare two labels that identify the corresponding two places, to check whether the two labels are similar;

wherein storage of the place of relevance in the non-transitory memory is further based on the two labels being determined to be similar.

15. The device of claim 14 wherein:

the one or more labels are obtained from at least two different users.

16. The device of claim 12 wherein the software further causes the one or more processors to identify the one or more places by:

comparing to a similarity threshold, a value of a measure of similarity of each measurement in the subset.

17. The device of claim 12 wherein:

the software further causes the one or more processors to create a root node of a tree based on the set of measurements of wireless signals and multiple child nodes in the tree connected to the root node, wherein at least one child node is created based on the subset.

18. The device of claim 12 wherein:

determination of similarity of the corresponding two places is independent of geographic information.

19. A non-transitory computer readable storage medium comprising software to discover places of relevance, which when executed by a processor performs steps in a method comprising:

receiving a set of measurements of wireless signals;

identifying one or more places, each place having a signal measurements centroid and a size of spatial expansion, the signal measurements centroid being computed by using at least a subset of measurements from multiple transmitters in the set of measurements of wireless signals;

wherein the signal measurements centroid comprises a vector of values of signal strengths, each value in the vector being computed based on a plurality of strengths of a corresponding wireless signal of a transmitter;

wherein the signal measurements centroid is based on measurements in the subset of each place being measured sequentially in time relative to one another along a real world path that starts in, ends in or passes through the each place;

determining based at least on comparison of two vectors of values of signal strengths of two signal measurements centroids to one another, whether corresponding two places that have the two signal measurements centroids, are similar; and storing in non-transitory memory, a new place based on the corresponding two places being determined to be similar at least by comparison of the two vectors of values of signal strengths, the new place having a new signal measurements centroid and a new size of spatial expansion;

wherein the comparison comprises at least executing a similarity function to compare the two vectors.

20. The non-transitory computer readable storage medium of claim 19 wherein:

identification of the one or more places is independent of a time at which each measurement is made.

21. The non-transitory computer readable storage medium of claim 20 wherein the steps in the method further comprise:

receiving user input on one or more labels to identify the one or more places respectively; and comparing two labels that identify the corresponding two places, to check whether the two labels are similar;

wherein storage of the place of relevance in the non-transitory memory is further based on the two labels being determined to be similar.

22. The non-transitory computer readable storage medium of claim 19 wherein the identifying of the one or more places in the method comprises:

comparing to a similarity threshold, a value of a measure of similarity of each measurement in the subset.

23. The non-transitory computer readable storage medium of claim 22 wherein:

the value of the measure of similarity is obtained by at least executing a similarity function is executed to compare the vector of values of signal strengths in the centroid with a vector of signal strengths in the each measurement two vectors.

24. The non-transitory computer readable storage medium of claim 19 wherein the steps in the method further comprise:

creating a root node of a tree based on the set of measurements of wireless signals and multiple child nodes in the tree connected to the root node, wherein at least one child node is created based on the subset.

25. The non-transitory computer readable storage medium of claim 19 wherein:

determination of similarity of the corresponding two places is independent of geographic information.

26. A system comprising a processor coupled to a memory and a wireless receiver, the system comprising:

means for obtaining a set of measurements of wireless signals;

means for identifying one or more places, each place having a signal measurements centroid and a size of spatial expansion, the signal measurements centroid being computed by using at least a subset of measurements from multiple transmitters in the set of measurements of wireless signals;

wherein the signal measurements centroid comprises a vector of values of signal strengths, each value in the vector being computed based on a plurality of strengths of a corresponding wireless signal of a transmitter;

wherein the signal measurements centroid is based on measurements in the subset of each place being measured sequentially in time relative to one another along a real world path that starts in, ends in or passes through the each place;

means for determining based at least on comparing two vectors of values of signal strengths of two signal measurements centroids to one another, whether corresponding two places that have the two signal measurements centroids, are similar; and means for storing in non-transitory memory, a new place based on the corresponding two places being determined to be similar at least by comparison of the two vectors of values of signal strengths, the new place having a new signal measurements centroid and a new size of spatial expansion;

wherein the comparison comprises at least executing a similarity function to compare the two vectors.

27. The system of claim 26 wherein:

the determining is performed independent of a time at which each measurement is made.

28. The system of claim 27 further comprising:

means for receiving user input on one or more labels to identify the one or more places respectively; and means for comparing two labels that identify the corresponding two places, to check whether the two labels are similar;

wherein the means for storing is further based on the two labels being determined to be similar.

29. The system of claim 26 wherein the means for identifying of the one or more places comprises:

means for comparing to a similarity threshold, a value of a measure of similarity of each measurement in the subset.

30. The system of claim 26 further comprising:

means for creating a root node of a tree based on the set of measurements of wireless signals and multiple child nodes in the tree connected to the root node, wherein at least one child node is created based on the subset.

31. An apparatus for discovering extended places of relevance, comprising:

at least one processor; and non-transitory memory storing computer-readable instructions that, when executed by the at least one processor, cause the apparatus to:

receive a set of measurements of wireless signals;

identify one or more places, each place having a signal measurements centroid and a size of spatial expansion, the signal measurements centroid being computed using at least a subset of measurements from multiple transmitters in the set of measurements of wireless signals;

wherein the signal measurements centroid comprises a vector of values of signal strengths, each value in the vector being computed based on a plurality of strengths of a corresponding wireless signal of a transmitter;

wherein the signal measurements centroid is based on measurements in the subset of each place being measured sequentially in time relative to one another along a real world path that starts in, ends in or passes through the each place;

determine, based at least on comparison of two vectors of values of signal strengths of two signal measurements centroids to one another, whether corresponding two places that have the two signal measurements centroids, are similar; and store in the non-transitory memory, a new place based on the corresponding two places being determined to be similar at least by comparison of the two vectors of values of signal strengths, the new place having a new signal measurements centroid and a new size of spatial expansion;

wherein the comparison comprises at least executing a similarity function to compare the two vectors.

32. The apparatus of claim 31 wherein:

determination of similarity of the corresponding two places is independent of geographic information.

33. The method of claim 1 wherein:

each spatial expansion has dimensions of a room in a building.

34. A method of discovering places of relevance, comprising:

receiving, by a computing device, a set of measurements of wireless signals;

identifying, by the computing device, one or more places, each place having a signal measurements centroid and a size of spatial expansion, the signal measurements centroid being computed using at least a subset of measurements from multiple transmitters in the set of measurements of wireless signals;

wherein the signal measurements centroid comprises a vector of values of signal strengths, each value in the vector being computed based on a plurality of strengths of a corresponding wireless signal of a transmitter;

wherein the signal measurements centroid is based on measurements in the subset of each place being measured sequentially in time relative to one another along a real world path that starts in, ends in or passes through the each place;

determining, by the computing device, based at least on comparing two vectors of values of signal strengths of two signal measurements centroids to one another, whether corresponding two places that have the two signal measurements centroids, are similar; and storing in non-transitory memory, by the computing device, a new place based on the corresponding two places being determined to be similar at least by comparison of the two vectors of values of signal strengths, the new place having a new signal measurements centroid and a new size of spatial expansion;

wherein the identifying of the one or more places is based on comparing to a similarity threshold, a value of a measure of similarity of each measurement in the subset.

35. The method of claim 34 wherein:

the identifying is performed independent of a time at which each measurement is made.

36. The method of claim 35 further comprising:

receiving user input on one or more labels to identify the one or more places respectively; and comparing, by the computing device, two labels that identify the corresponding two places, to check whether the two labels are similar;

wherein the storing is performed further based on the two labels being determined to be similar.

37. The method of claim 36 wherein:

the one or more labels are obtained from at least two different users.

38. The method of claim 37 wherein:

a first set of the one or more labels is designated as public; and a second set of the one or more labels is designated as private to at least one user of the at least two different users.

39. The method of claim 34 wherein:

the comparing comprises at least executing a similarity function to compare the two vectors.

40. The method of claim 34 wherein:

the each measurement comprises a group of identifiers of a corresponding group of transmitters, and strengths of wireless signals therefrom; and each value in each vector in each centroid is an average of the plurality of strengths.

41. The method of claim 34 further comprising:

creating a root node of a tree based on the set of measurements of wireless signals and multiple child nodes in the tree connected to the root node, wherein at least one child node is created based on the subset.

42. The method of claim 41 further comprising:

comparing multiple subsets in the set of measurements of wireless signals, with subsets of additional measurements, to identify the new place.

43. The method of claim 34 further comprising:

comparing multiple subsets in the set of measurements of wireless signals, with subsets in another set of measurements, to identify a known place of relevance.

44. The method of claim 34 wherein:

the determining is performed independent of geographic information.

45. A device for processing measurements, the device comprising:

a wireless transceiver;

one or more processors coupled to the wireless transceiver;

non-transitory memory coupled to the one or more processors; and software held in the non-transitory memory that when run in the one or more processors, causes the one or more processors to:

receive a set of measurements of wireless signals;

identify one or more places, each place having a signal measurements centroid and a size of spatial expansion, the signal measurements centroid being computed by using at least a subset of measurements from multiple transmitters in the set of measurements of wireless signals;

wherein the signal measurements centroid comprises a vector of values of signal strengths, each value in the vector being computed based on a plurality of strengths of a corresponding wireless signal of a transmitter;

wherein the signal measurements centroid is based on measurements in the subset of each place being measured sequentially in time relative to one another along a real world path that starts in, ends in or passes through the each place;

determine, based at least on comparison of two vectors of values of signal strengths of two signal measurements centroids to one another, whether corresponding two places that have the two signal measurements centroids, are similar; and store in the non-transitory memory, a new place based on the corresponding two places being determined to be similar at least by comparison of the two vectors of values of signal strengths, the new place having a new signal measurements centroid and a new size of spatial expansion;

wherein identification of the one or more places is based on comparing to a similarity threshold, a value of a measure of similarity of each measurement in the subset.

46. The device of claim 45 wherein:

identification of the one or more places is independent of a time at which each measurement is made.

47. The device of claim 46 wherein the software further causes the one or more processors to:

receive user input on one or more labels to identify the one or more places respectively; and compare two labels that identify the corresponding two places, to check whether the two labels are similar;

wherein storage of the place of relevance in the non-transitory memory is further based on the two labels being determined to be similar.

48. The device of claim 47 wherein:

the one or more labels are obtained from at least two different users.

49. The device of claim 34 wherein the software further causes the one or more processors to identify the one or more places by:

comparing to a similarity threshold, a value of a measure of similarity of each measurement in the subset.

50. The device of claim 34 wherein:

the software further causes the one or more processors to create a root node of a tree based on the set of measurements of wireless signals and multiple child nodes in the tree connected to the root node, wherein at least one child node is created based on the subset.

51. The device of claim 34 wherein:

determination of similarity of the corresponding two places is independent of geographic information.

52. A non-transitory computer readable storage medium comprising software to discover places of relevance, which when executed by a processor performs steps in a method comprising:

receiving a set of measurements of wireless signals;

identifying one or more places, each place having a signal measurements centroid and a size of spatial expansion, the signal measurements centroid being computed by using at least a subset of measurements from multiple transmitters in the set of measurements of wireless signals;

wherein the signal measurements centroid comprises a vector of values of signal strengths, each value in the vector being computed based on a plurality of strengths of a corresponding wireless signal of a transmitter;

wherein the signal measurements centroid is based on measurements in the subset of each place being measured sequentially in time relative to one another along a real world path that starts in, ends in or passes through the each place;

determining based at least on comparison of two vectors of values of signal strengths of two signal measurements centroids to one another, whether corresponding two places that have the two signal measurements centroids, are similar; and storing in non-transitory memory, a new place based on the corresponding two places being determined to be similar at least by comparison of the two vectors of values of signal strengths, the new place having a new signal measurements centroid and a new size of spatial expansion;

wherein the identifying of the one or more places is based on comparing to a similarity threshold, a value of a measure of similarity of each measurement in the subset.

53. The non-transitory computer readable storage medium of claim 52 wherein:

identification of the one or more places is independent of a time at which each measurement is made.

54. The non-transitory computer readable storage medium of claim 52 wherein the steps in the method further comprise:

receiving user input on one or more labels to identify the one or more places respectively; and comparing two labels that identify the corresponding two places, to check whether the two labels are similar;

wherein storage of the place of relevance in the non-transitory memory is further based on the two labels being determined to be similar.

55. The non-transitory computer readable storage medium of claim 52 wherein the identifying of the one or more places in the method comprises:

comparing to a similarity threshold, a value of a measure of similarity of each measurement in the subset.

56. The non-transitory computer readable storage medium of claim 52 wherein:

the value of the measure of similarity is obtained by at least executing a similarity function is executed to compare the vector of values of signal strengths in the centroid with a vector of signal strengths in the each measurement two vectors.

57. The non-transitory computer readable storage medium of claim 52 wherein the steps in the method further comprise:

creating a root node of a tree based on the set of measurements of wireless signals and multiple child nodes in the tree connected to the root node, wherein at least one child node is created based on the subset.

58. The non-transitory computer readable storage medium of claim 52 wherein:

determination of similarity of the corresponding two places is independent of geographic information.

59. A system comprising a processor coupled to a memory and a wireless receiver, the system comprising:

means for obtaining a set of measurements of wireless signals;

means for identifying one or more places, each place having a signal measurements centroid and a size of spatial expansion, the signal measurements centroid being computed by using at least a subset of measurements from multiple transmitters in the set of measurements of wireless signals;

wherein the signal measurements centroid comprises a vector of values of signal strengths, each value in the vector being computed based on a plurality of strengths of a corresponding wireless signal of a transmitter;

wherein the signal measurements centroid is based on measurements in the subset of each place being measured sequentially in time relative to one another along a real world path that starts in, ends in or passes through the each place;

means for determining based at least on comparing two vectors of values of signal strengths of two signal measurements centroids to one another, whether corresponding two places that have the two signal measurements centroids, are similar; and means for storing in non-transitory memory, a new place based on the corresponding two places being determined to be similar at least by comparison of the two vectors of values of signal strengths, the new place having a new signal measurements centroid and a new size of spatial expansion;

wherein the means for identifying comprises means for comparing to a similarity threshold, a value of a measure of similarity of each measurement in the subset.

60. The system of claim 59 wherein:

the determining is performed independent of a time at which each measurement is made.

61. The system of claim 60 further comprising:

means for receiving user input on one or more labels to identify the one or more places respectively; and means for comparing two labels that identify the corresponding two places, to check whether the two labels are similar;

wherein the means for storing is further based on the two labels being determined to be similar.

62. The system of claim 59 wherein the means for identifying of the one or more places comprises:

means for comparing to a similarity threshold, a value of a measure of similarity of each measurement in the subset.

63. The system of claim 59 further comprising:

means for creating a root node of a tree based on the set of measurements of wireless signals and multiple child nodes in the tree connected to the root node, wherein at least one child node is created based on the subset.

64. An apparatus for discovering extended places of relevance, comprising:

at least one processor; and non-transitory memory storing computer-readable instructions that, when executed by the at least one processor, cause the apparatus to:

receive a set of measurements of wireless signals;

identify one or more places, each place having a signal measurements centroid and a size of spatial expansion, the signal measurements centroid being computed using at least a subset of measurements from multiple transmitters in the set of measurements of wireless signals;

wherein the signal measurements centroid comprises a vector of values of signal strengths, each value in the vector being computed based on a plurality of strengths of a corresponding wireless signal of a transmitter;

wherein the signal measurements centroid is based on measurements in the subset of each place being measured sequentially in time relative to one another along a real world path that starts in, ends in or passes through the each place;

determine, based at least on comparison of two vectors of values of signal strengths of two signal measurements centroids to one another, whether corresponding two places that have the two signal measurements centroids, are similar; and store in the non-transitory memory, a new place based on the corresponding two places being determined to be similar at least by comparison of the two vectors of values of signal strengths, the new place having a new signal measurements centroid and a new size of spatial expansion;

wherein identification of the one or more places is based on comparing to a similarity threshold, a value of a measure of similarity of each measurement in the subset.

65. The apparatus of claim 64 wherein:

determination of similarity of the corresponding two places is independent of geographic information.

66. The method of claim 34 wherein:

each spatial expansion has dimensions of a room in a building.

* * * * *